(12) United States Patent
Horiuchi et al.

(10) Patent No.: US 12,302,362 B2
(45) Date of Patent: May 13, 2025

(54) TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 362 days.

(21) Appl. No.: 17/797,683

(22) PCT Filed: Nov. 12, 2020

(86) PCT No.: PCT/JP2020/042192
§ 371 (c)(1),
(2) Date: Aug. 4, 2022

(87) PCT Pub. No.: WO2021/161602
PCT Pub. Date: Aug. 19, 2021

(65) Prior Publication Data
US 2023/0156744 A1 May 18, 2023

(30) Foreign Application Priority Data
Feb. 13, 2020 (JP) .................................. 2020-022683

(51) Int. Cl.
*H04W 72/25* (2023.01)
*H04L 5/00* (2006.01)
*H04W 72/0446* (2023.01)

(52) U.S. Cl.
CPC ........... *H04W 72/25* (2023.01); *H04L 5/0048* (2013.01); *H04W 72/0446* (2013.01)

(58) Field of Classification Search
CPC ... H04W 72/25; H04W 72/0446; H04W 4/40; H04W 92/18; H04L 5/0048; H04L 5/0044; H04L 5/0053; Y02D 30/70
See application file for complete search history.

(56) References Cited

U.S. PATENT DOCUMENTS

2020/0396760 A1* 12/2020 Yi .......................... H04L 1/1812
2021/0105119 A1* 4/2021 Sarkis ................... H04L 5/0051
(Continued)

FOREIGN PATENT DOCUMENTS

CN    110505703 A    11/2019

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0 Jun. 2018. (39 pages).
(Continued)

*Primary Examiner* — Abdullahi Ahmed
(74) *Attorney, Agent, or Firm* — Seed IP Law Group LLP

(57) ABSTRACT

A terminal (200) is provided with a control circuit (20A) and a transmitting circuit (20B). The control circuit (20A) determines an arrangement, with respect to a side link data channel, of second control information related to first control information transmitted in the side link, on the basis of the arrangement of a reference signal in the data channel and the arrangement of a control channel. The transmitting circuit (20B) transmits the data channel in accordance with the determined arrangement.

11 Claims, 21 Drawing Sheets

(56) References Cited

U.S. PATENT DOCUMENTS

| | | | | |
|---|---|---|---|---|
| 2022/0070036 A1* | 3/2022 | Kwon | ................ | H04L 27/2613 |
| 2022/0210804 A1* | 6/2022 | Hwang | ................ | H04L 5/0053 |
| 2022/0272727 A1* | 8/2022 | Salim | ................... | H04L 5/0051 |
| 2022/0312401 A1* | 9/2022 | Zhang | ................. | H04W 4/20 |
| 2023/0299909 A1* | 9/2023 | Lee | ........................ | H04W 4/40 |
| | | | | 370/329 |
| 2023/0300859 A1* | 9/2023 | Horiuchi | .............. | H04W 72/25 |
| | | | | 370/252 |

OTHER PUBLICATIONS

3GPP, "3rd Generation Partnership Project; Technical Specification Group Services and System Aspects; System Architecture for the 5G System; Stage 2 (Release 16)," 3GPP TS 23.501 V16.1.0 Jun. 2019, 368 pages.

3GPP, "3rd Generation Partnership Project; Technical Specification Group Radio Access Network; NR; Physical channels and modulation (Release 15)," 3GPP TS 38.211 V15.6.0 Jun. 2019, 97 pages.

3GPP, "3rd Generation Partnership Project; Technical Specification Group Radio Access Network; NR; NR and NG-RAN Overall Description; Stage 2 (Release 15)," 3GPP TS 38.300 V15.6.0 Jun. 2019, 99 pages.

3GPP, "3$^{rd}$ Generation Partnership Project; Technical Specification Group Radio Access Network; NR; Study on NR Vehicle-to-Everything (V2X)," 3GPP TR 38.885 V16.0.0 Mar. 2019, 122 pages.

3GPP, "3$^{rd}$ Generation Partnership Project; Technical Specification Group Radio Access Network; NR; Physical layer procedures for data (Release 16)," 3GPP TS 38.214 V16.0.0 Dec. 2019, 147 pages.

CATT, "Physical Layer Structure for NR Sidelink" R1-1912153, Agenda Item 7.2.4.1, 3GPP TSG RAN WG1 Meeting #99, Nov. 9, 2019, 24 pages.

Huawei, HiSilicon, "Sidelink physical layer structure for NR V2X", R1-1911882, Agenda Item 7.2.4.1.1, 3GPP TSG RAN WG1 Meeting #99, Reno, USA, Nov. 18-22, 2019, 36 pages.

International Search Report, dated Feb. 9, 2021, for International Application No. PCT/JP2020/042192, 5 pages.

* cited by examiner

TERMINAL, AND COMMUNICATION METHOD

TECHNICAL FIELD

The present disclosure relates to a terminal and a communication method.

BACKGROUND ART

In a communication system called the 5th Generation Mobile Communication System (5G), it has been discussed to flexibly provide functions for each of use cases such as an increase in communication traffic, an increase in the number of terminals to be connected, high reliability, and low latency. The 3GPP, an international standards-developing organization, has been studying development of a communication system in terms of both the development of the LTE system and New Radio (NR).

In the 3GPP, it has been first considered to support vehicle to X (everything), which is referred to as V2X, in the LTE system. It is also considered to support V2X in NR, the available band for which is broader than in the LTE system.

CITATION LIST

Non Patent Literature

NPL 1
  3GPP TR 38.885 V16.0.0. Study on NR Vehicle-to-Everything (V2X) (Release 16), 2019-03
NPL 2
  3GPP TS 38.214 V16.0.0 (2019-12)

SUMMARY OF INVENTION

Technical Problem

There is scope for further study on mapping (or allocation) of control information in a case where the control information is transmitted in a data channel of sidelink (SL) in V2X, for example.

One non-limiting and exemplary embodiment facilitates providing a terminal and a communication method each capable of enhancing reliability for reception of control information mapped to a data channel of sidelink.

Solution to Problem

A terminal according to an embodiment of the present disclosure includes: control circuitry, which, in operation, determines mapping of certain control information to a data channel of sidelink based on mapping of a reference signal in the data channel and mapping of a control channel, the certain control information being related to first control information and being referred to as second control information, the first control information being transmitted in the sidelink; and transmission circuitry, which, in operation, transmits the data channel in accordance with the determined mapping.

It should be noted that general or specific embodiments may be implemented as a system, an apparatus, a method, an integrated circuit, a computer program, a storage medium, or any selective combination thereof.

Advantageous Effects of Invention

According to an exemplary embodiment of the present disclosure, it is possible to enhance reliability for reception of control information mapped to a data channel of sidelink.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
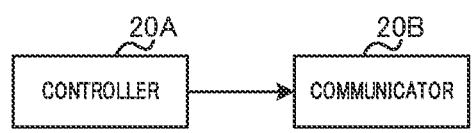
FIG. 1 is a block diagram illustrating an exemplary configuration of a part of a terminal.

Hereinafter, embodiments of the present invention will be described in detail with reference to the drawings as appropriate. However, a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for the person skilled in the art to sufficiently understand the present disclosure, and are not intended to limit the subject matter described in the claims.

<V2X>

In V2X, at least one of the following communication is assumed: Vehicle to Vehicle (V2V); Vehicle to Infrastructure (V2I); Vehicle to Pedestrian (V2P); and Vehicle to Network (V2N) communication, for example.

In the V2V, V2I, or V2P, for example, terminals (or also referred to as user equipment (UE)) can perform direct communication with each other using a link called "sidelink (SL)" or "PC5" without through a network with a base station (BS: also referred to as gNB in NR and eNB in LTE). For example, communication through a link between a base station and a terminal (e.g., referred to as "Uu") is assumed in the V2N.

A resource used for the sidelink is configured depending on a SL bandwidth part (BWP) and a resource pool, for example.

The SL BWP is, for example, a frequency band available to a terminal for the sidelink. The SL BWP is configured separately from a Downlink (DL) BWP and an Uplink (UL) BWP, for example, which are configured for a link (e.g., Uu link) between a base station and a terminal. The frequency bands possibly overlap with each other between the SL BWP and the UL BWP.

The resource pool includes, for example, a resource in the frequency and time directions specified in a resource of the SL BWP. For example, a plurality of resource pools may be configured for a single terminal.

<Sidelink in NR>

For NR V2X, studies have been conducted on supporting, for example, unicast, groupcast, and broadcast in sidelink communication (e.g., at least one of transmission and reception).

In unicast, one-to-one transmission from a transmitter terminal (e.g., also called transmitter UE or Tx UE) to a receiver terminal (e.g., receiver UE or Rx UE) is assumed, for example. In groupcast, transmission from a transmitter terminal to a plurality of receiver terminals included in a certain group is assumed, for example. In broadcast, transmission from a transmitter terminal without specifying a receiver terminal is assumed, for example.

<Channels for SL>

Studies have been carried out on configuring, for example, the following channels for NR SL: a physical SL control channel (PSCCH), physical SL shared channel (PSSCH), physical SL feedback channel (PSFCH), and physical SL broadcast channel (PSBCH).

The PSCCH is an exemplary control channel in the SL, and the PSSCH is an exemplary data channel in the SL. The PSFCH is an exemplary channel used for transmission of a feedback signal in the SL, and the PSBCH is an exemplary broadcast channel used for transmission not specifying a receiver terminal. Note that, in the following description, a "signal" and "information" may be replaced with each other depending on the context.

The PSCCH is mapped with, for example, a control signal (control information) called sidelink control information (SCI). The SCI includes, for example, information (or parameter) on at least one of transmission and reception of the PSSCH, such as resource allocation information for a data signal (e.g., PSSCH).

Information contents of the SCI may be divided (sorted or classified) into, for example, first information (or control information) and second information (or control information). In other words, the SCI may include, for example, the "first control information" and the "second control information" on the SL. The "second control information" may be considered to be exemplary information on the "first control information". The "first control information" and the "second control information" may be referred to as, for example, "1st stage SCI" and "2nd stage SCI" respectively.

These two names of the SCI may be replaced with other names to distinguish from each other. For example, to indicate the "1st stage SCI", another name including a term such as "master" or "primary" may be used. To indicate the "2nd stage SCI", another name including a term such as "secondary" or "non-primary" may be used.

The 1st stage SCI may be mapped to the PSCCH, which is an exemplary SL control channel, and the 2nd stage SC may be mapped to the PSSCH, which is an exemplary SL data channel. In other words, the SCI may be mapped by being distributed between the PSCCH and PSSCH. Note that the term "mapping" may be replaced with another appropriate term among those skilled in the art, such as "allocation" and "(mapping) pattern" (the same applies to the following description).

The PSSCH is mapped with, for example, a data signal, or a data signal and SCI (e.g., 2nd stage SCI).

In the PSFCH, a feedback signal (e.g., hybrid automatic repeat request (HARQ) feedback) to a PSSCH (e.g., data signal) is mapped, for example. The feedback signal may include, for example, a response signal indicating ACK or NACK (e.g., also referred to as ACK/NACK information or HARQ-ACK).

The feedback signal may be applied, for example, to a case where the PSSCH is transmitted and received in unicast and groupcast. The ACK and NACK may be respectively referred to as HARQ-ACK and HARQ-NACK, for example.

The PSBCH is mapped with, for example, a broadcast signal not specifying a receiver terminal.

<SCI>

As described above, the SCI may be divided into the 1st stage SCI and the 2nd stage SCI. The following is non-limiting and exemplary information respectively included in the 1st stage SCI and the 2nd stage SCI.

<1St Stage SCI>

Priority—3 bits

Frequency resource assignment

Time resource assignment—5 bits or 9 bits

Resource reservation period—[log 2 (N_(reservePeriod))] bits or 0 bits

DMRS pattern [x] bits or 0 bits

2nd stage SCI format [x] bits

Beta_offset indicator [2] bits

Number of DMRS port 1 bit

Modulation and coding scheme—5 bits

Reserved [2-4] bits

<2nd Stage SCI>

HARQ Process ID—[x] bits

New data indicator—1 bit

Redundancy version—2 bits

Source ID—8 bits

Destination ID—16 bits

CSI request—1

[If the 2nd-stage SCI format field in the corresponding SCI format 0-1 indicates type 1 groupcast as defined in subclause x.x.x of [6, TS 38.214], the following fields are present:]

Zone ID—[x] bits as defined in subclause x.x.x of [6, TS 38.214]

Communication range requirement—[4] bits

Dividing the information contents of the SCI into two in this manner reduces the number of bits and the size of the 1st stage SCI. The 1st stage SCI may be mapped to, for example, the PSCCH, and the 2nd stage SCI may be mapped to, for example, the PSSCH (may be apart of the PSSCH). Note that the "DMRS" is an abbreviation for a demodulation reference signal, and the "CSI" is an abbreviation for channel state information.

In the V2X SL communication, a terminal determines a resource to be used for transmission after confirming a resource usage status (or reservation status) of another terminal through sensing. The resource usage status (or reservation status) of another terminal can be confirmed based on, for example, information indicating allocation of a resource (e.g., at least one of a time resource and frequency resource) for the SL, i.e., resource allocation information.

Thus, including (or positioning) information relating to the sensing, such as SL resource allocation information, in the 1st stage SCI, for example, reduces the amount of information to be sensed (may be referred to as received or detected) by a terminal, thereby reducing the processing load on the terminal.

<Modes in SL>

SL communication includes, for example, two modes (e.g., Mode 1 and Mode 2).

In Mode 1, for example, a base station determines (i.e., schedules) a resource that a terminal uses for the SL (referred to as an SL resource, for example).

In Mode 2, for example, a terminal determines the SL resource from resources in a resource pool configured in advance. In other words, a base station need not schedule the SL resource in Mode 2.

Mode 1 is intended to be used, for example, in an environment where the base station and the terminal are connected and the terminal performing sidelink communication can receive an indication from the base station. Meanwhile, in Mode 2, the terminal can determine the SL resource without an indication from the base station, for example, so that the sidelink communication is possible with a terminal under a different operator or a terminal outside coverage.

Sidelink has been described, thus far.

[Overview of Communication System]

Figure 2:
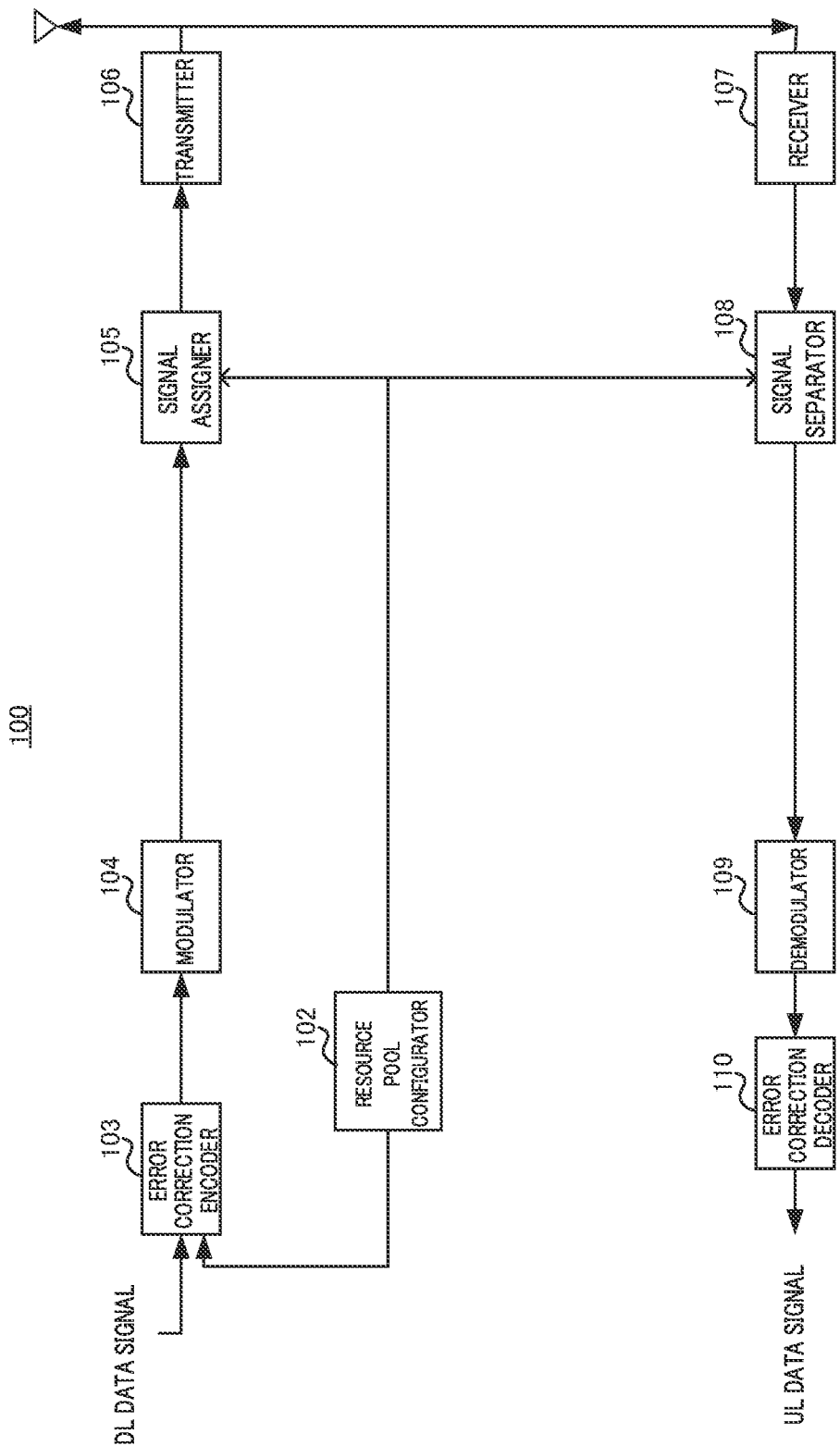
FIG. 2 is a block diagram illustrating an exemplary configuration of a base station.
Figure 3:
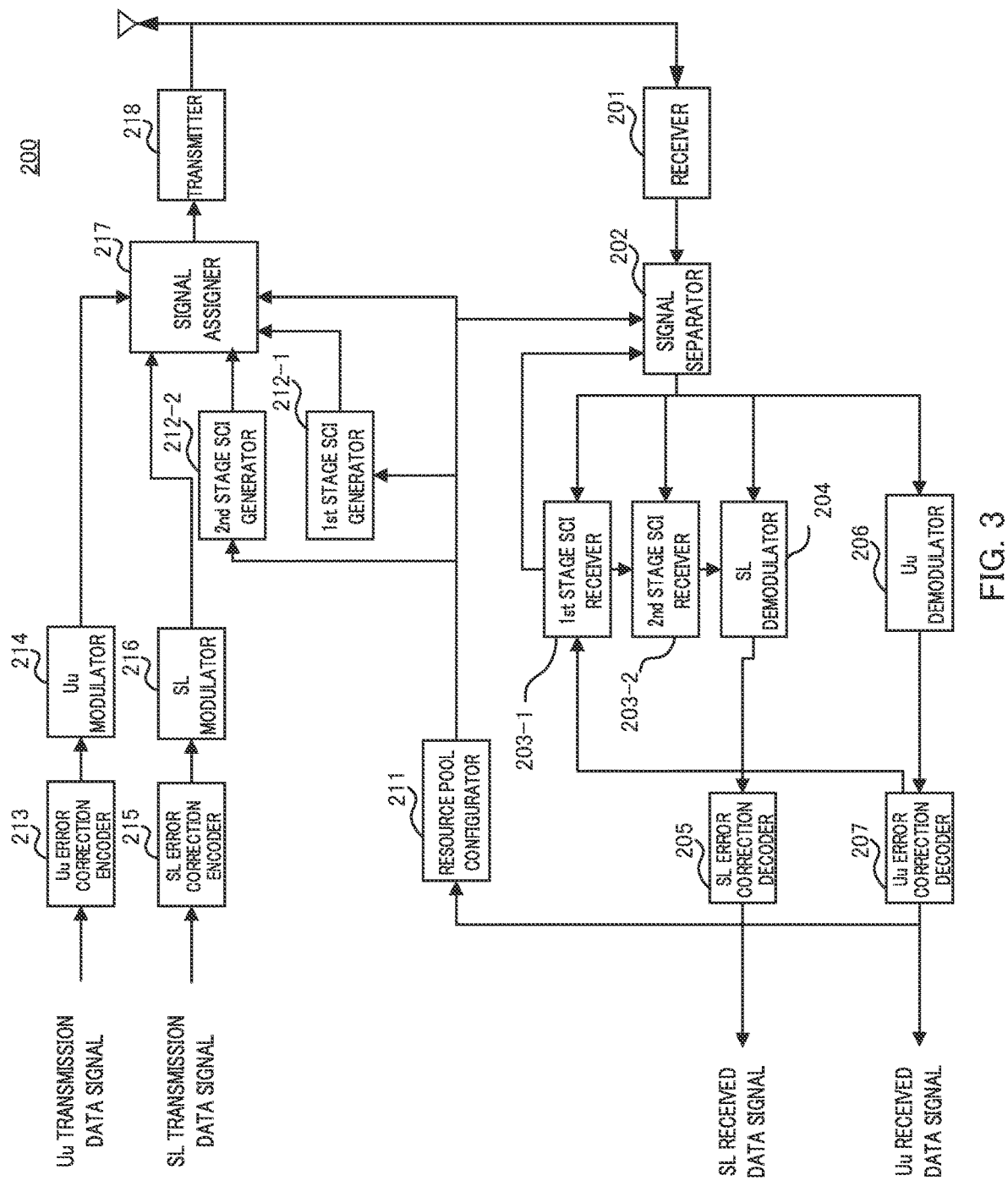
FIG. 3 is a block diagram illustrating an exemplary configuration of the terminal.

A communication system according to the present embodiment includes base station 100 exemplified in FIG. 2 and terminal 200 exemplified in FIGS. 1 and 3. The number of terminals 200 may be one or more, but is two or more in a case of focusing on the sidelink communication.

FIG. 1 is a block diagram illustrating an exemplary configuration of a part of terminal 200 according to Embodiment 1. Terminal 200 illustrated in FIG. 1 includes, for example, controller (or control circuitry) 20A and communicator (or communication circuitry) 20B. Controller 20A, for example, determines (or specifies or identifies) mapping of the 2nd stage SCI on the PSSCH. Communicator 20B performs transmission or reception of the PSSCH according to the determined (or specified or identified) mapping.

[Configuration of Base Station]

FIG. 2 is a block diagram illustrating an exemplary configuration of base station 100 according to Embodiment 1. In FIG. 2, base station 100 includes, for example, resource pool configurator 102, error correction encoder 103, modulator 104, signal assigner 105, transmitter 106, receiver 107, signal separator 108, demodulator 109, and error correction decoder 110.

Resource pool configurator 102 configures a resource pool to be used for sidelink for each terminal 200. For example, resource pool configurator 102 generates information on a time resource and a frequency resource of the resource pool (hereinafter, referred to as resource pool configuration information). In generating the resource pool configuration information, a requirement for each resource pool (e.g., moving speed and throughput requirement) and resource contention with a Uu link may be taken into account.

The resource pool configuration information may include, for example, information such as the number of PSCCH symbols used for sidelink, the number of PSSCH symbols available in a sidelink slot, and the number of demodulation reference signals (DMRSs) mapped to the PSSCH. Note that the "symbol" is anon-limiting example of a time resource.

The generated resource pool configuration information may be instructed or indicated to terminal 200, for example. Higher layer signaling, such as RRC or MAC, may be used for the instruction or indication, for example. The resource pool configuration information may be included in the higher layer signaling, for example. Thus, the generated resource pool configuration information may be outputted to the error correction encoder, for example. The resource pool configuration information may also be outputted to the signal assigner and signal separator.

Error correction encoder 103, for example, takes a transmission data signal (DL data signal) and higher layer signaling as input, performs error correction encoding on the input signal, and outputs the encoded signal to modulator 104.

Modulator 104, for example, performs modulation processing on the signal inputted from error correction encoder 103, and outputs the modulated data signal to signal assigner 105.

Signal assigner 105, for example, recognizes (or identifies) a slot available for a link (e.g., Uu link) between base station 100 and terminal 200 and a slot available for the sidelink communication based on the information inputted from resource pool configurator 102.

When terminal 200 does not perform transmission or reception simultaneously on the Uu link used for a DL data signal and on the sidelink, for example, signal assigner 105 may allocate a resource that is not used for the sidelink to a resource available for a DL data signal between base station 100 and terminal 200. Note that the configuration of the resource pool may be different for each terminal 200. In the case where the configuration of the resource pool is different for each terminal 200, the available slot between base station 100 and terminal 200 could be different for each terminal 200.

Signal assigner 105 also assigns the data signal (e.g., DL data signal or higher layer signaling) inputted from modulator 104 to the resource available for the Uu link, for example. The formed transmission signal is outputted to transmitter 106, for example.

Transmitter 106 performs radio transmission processing, such as up-conversion and amplification, on the signal inputted from signal assigner 105, and transmits the radio signal to terminal 200 from an antenna.

Receiver 107 receives a signal transmitted from terminal 200 at the antenna, performs radio reception processing such as low noise amplification and down-conversion, and outputs the received signal to signal separator 108.

Signal separator 108, for example, recognizes (identifies) the slot available for the Uu link and the slot available for the sidelink communication, for example, based on the information inputted from resource pool configurator 102. Signal separator 108 then separates the signal assigned to the resource available for the Uu link, which is inputted from receiver 107, for example. Signal separator 108 outputs the separated signal (e.g., UL data signal) to demodulator 109.

Demodulator 109, for example, performs demodulation processing on the signal inputted from signal separator 108, and outputs the demodulated signal to error correction decoder 110.

Error correction decoder 110, for example, decodes the signal inputted from demodulator 109, and obtains the received data signal (UL data signal) from terminal 200.

Note that, although FIG. 2 describes an example where base station 100 includes resource pool configurator 102 and higher layer signaling including resource pool configuration information is generated in base station 100, the present disclosure is not limited to this.

For example, the resource pool configuration information may be configured in an application layer called Pre-configured, or may be configured in a subscriber identity module (SIM) in advance. In this case, base station 100 may use the pre-configured information without generating the resource pool configuration information.

For example, base station 100 may recognize the slot available between base station 100 and terminal 200 based on the pre-configured resource pool configuration information, and may output information indicating the slot available between base station 100 and terminal 200 to signal assigner 105 and signal separator 108.

In addition, in a case where the configuration of the information for a resource pool such as the number of PSCCH symbols, the number of PSSCH symbols available in a (SL) slot, and the number of DMRSs mapped to the PSSCH is a configuration in the specification (standard), SIM, or an application, terminal 200 is capable of performing the SL communication autonomously even when the instruction or indication on the configuration is not received from base station 100.

Further, it is considered in Mode 1 that base station 100 generates information (e.g., SCI) transmitted by terminal 200 via the SL. In this case, base station 100 may include a function similar to an SCI generator, which is described later in FIG. 3, included in terminal 200, and generate SCI based on the resource pool configuration information. The generated SCI may be transmitted to terminal 200 by a higher layer signal or a physical layer signal (e.g., PDCCH signal). Note that the "PDCCH" is an abbreviation for a physical downlink control channel.

[Configuration of Terminal]

FIG. 3 is a block diagram illustrating an exemplary configuration of terminal 200 according to Embodiment 1. Terminal 200 in V2X can be either a transmitter terminal or a receiver terminal in sidelink communication. In FIG. 3, terminal 200 includes, for example, receiver 201, signal separator 202, 1st stage SCI receiver 203-1, 2nd stage SCI receiver 203-2, SL demodulator 204, SL error correction decoder 205, Uu demodulator 206, and Uu error correction decoder 207. Terminal 200 also includes, for example, resource pool configurator 211, 1st stage SCI generator 212-1, 2nd stage SCI generator 212-2, Uu error correction encoder 213, Uu modulator 214, SL error correction encoder 215, SL modulator 216, signal assigner 217, and transmitter 218.

Receiver 201, for example, receives a received signal by an antenna, and outputs the signal to signal separator 202 after performing reception processing, such as low noise amplification and down-conversion, on the received signal.

Signal separator 202 separates signals respectively corresponding to the Uu link and the SL from the output signal from receiver 201 based on the resource pool configuration information inputted from resource pool configurator 211, for example. The Uu link signal is outputted to, for example, Uu demodulator 206. The PSCCH signal of the SL signal is outputted to, for example, 1st stage SCI receiver 203-1.

Signal separator 202, for example, separates a PSSCH signal for terminal 200 from the received signal based on resource allocation information inputted from 1st stage SCI receiver 203-1, and outputs the PSSCH signal to SL demodulator 204. Signal separator 202 also separates a 2nd stage SCI based on the resource pool configuration information (e.g., the number of DMRSs on PSSCH, the number of PSSCH symbols, and the number of physical resource blocks (PRBs) mapped to PSCCH) from resource pool configurator 211, 2nd stage SCI format information inputted from 1st stage SCI receiver 203-1, and the number of sub channels on the PSSCH. The separated 2nd stage SCI is inputted to 2nd stage SCI receiver 203-2, for example. Note that the "PRB" is a non-limiting example of a frequency resource.

1st stage SCI receiver 203-1, for example, attempts to demodulate and decode the PSCCH signal inputted from signal separator 202. When the decoding is successful (i.e., when a 1st stage SCI mapped to the PSCCH is detected), 1st stage SCI receiver 203-1 outputs, to signal separator 202, the allocation information of the frequency and time resources of the PSSCH and the 2nd stage SCI format information, which are included in the detected 1st stage SCI.

2nd stage SCI receiver 203-2, for example, confirms (or determines) whether the signal received by receiver 201 is a signal addressed to the received terminal 200 based on the source ID and destination ID included in the 2nd stage SCI. When the signal received by receiver 201 is a signal addressed to the received terminal 200, 2nd stage SCI receiver 203-2, for example, outputs information to be used for demodulation and decoding of the PSSCH to SL demodulator 204.

SL demodulator 204, for example, performs demodulation processing on the signal inputted from signal separator 202 based on the 2nd stage SCI information from 2nd stage SCI receiver 203-2, and outputs the resulting demodulated signal to SL error correction decoder 205.

SL error correction decoder 205, for example, decodes the demodulated signal inputted from SL demodulator 204, and performs error determination such as a cyclic redundancy check (CRC), for example, on the decoded signal. The signal determined to have no error as a result of the determination is outputted as a received data signal.

Uu demodulator 206, for example, performs demodulation processing on the signal inputted from signal separator 202, and outputs the resulting demodulated signal to Uu error correction decoder 207.

Uu error correction decoder 207 decodes the demodulated signal inputted from Uu demodulator 206, and outputs the decoded signal. Higher layer signaling among the decoded signal, for example, is outputted to resource pool configurator 211.

Note that, when at least one of SL error correction decoder 205 and Uu error correction decoder 207 determines that there is an error, feedback information including either ACK or NACK (may be referred to as ACK/NACK information)

may be generated. The feedback information need not be generated for groupcast in a case of ACK. In other words, only NACK among ACK and NACK may be fed back to the SL source in the case of groupcast.

For example, resource pool configurator 211 receives, from Uu error correction decoder 207, the resource pool configuration information included in the signal obtained by decoding the higher layer signaling in Uu error correction decoder 207. The resource pool configuration information includes, for example, information such as the number of PSCCH symbols to be used for the SL, the number of PSSCH symbols available in the SL (slot), and the number of DMRSs mapped to the PSSCH. Resource pool configurator 211 also outputs the resource pool configuration information to 1st stage SCI generator 212-1, signal assigner 217, and signal separator 202, for example.

1st stage SCI generator 212-1, for example, determines a frequency resource for transmitting the PSSCH, based on the resource pool configuration information (e.g., information of a resource available for the SL) inputted from resource pool configurator 211. 1st stage SCI generator 212-1 also determines information on demodulation and decoding (e.g., MCS) for the SL communication from the resource pool configuration information. 1st stage SCI generator 212-1 then generates SCI (1st stage SCI) including the determined information, for example. The generated SCI is outputted to signal assigner 217, for example, and assigned (i.e., mapped) to the PSCCH for the SL in signal assigner 217, for example.

2nd stage SCI generator 212-2 generates SCI (2nd stage SCI) based on the resource pool configuration information inputted from resource pool configurator 211, and outputs the generated SCI to signal assigner 217, for example. The SCI may include, for example, information identifying source terminal 200 (e.g., source ID) and information identifying destination terminal 200 (e.g., destination ID).

Uu error correction encoder 213 takes a Uu link transmission data signal (UL data signal) as input, for example, performs error correction encoding on the transmission data signal, and outputs the encoded signal to Uu modulator 214.

Uu modulator 214, for example, modulates the signal inputted from Uu error correction encoder 213, and outputs the modulated signal to signal assigner 217.

SL error correction encoder 215 takes an SL transmission data signal (SL data signal) as input, for example, performs error correction encoding on the transmission data signal, and outputs the encoded signal to SL modulator 216.

SL modulator 216, for example, modulates the signal inputted from SL error correction encoder 215, and outputs the modulated signal to signal assigner 217.

Resource pool configurator 211, for example, configures a resource pool (e.g., time resource and frequency resource) used by terminal 200 for the SL based on the resource pool configuration information included in the higher layer signaling inputted from Uu error correction decoder 207.

In addition, signal assigner 217 performs signal assignment to an SL resource based on the information on the resource to be used for the sidelink, which is inputted from resource pool configurator 211, and the resource allocation information for the SL signal, which is inputted from 1st stage SCI generator 212-1. For example, signal assigner 217 assigns the 1st stage SCI to the PSCCH, and assigns the 2nd stage SCI and SL data to the PSSCH. Signal assigner 217 also assigns the UL data signal inputted from Uu modulator 214 to a resource to be used for a physical uplink shared channel (PUSCH), which is an exemplary uplink data channel in the Uu link, for example. The signals assigned to the resources in the above-described manner are outputted to transmitter 218.

Note that, in signal assigner 217, the ACK/NACK information may be assigned to a feedback channel for the SL (e.g., PSFCH), for example.

Focusing on transmission processing, signal assigner 217 may correspond to controller 20A illustrated in FIG. 1, for example. Controller 20A may include, for example, at least one of resource pool configurator 211, 1st stage SCI generator 212-1, 2nd stage SCI generator 212-2, and signal assigner 217. Further, transmitter 218 may correspond to communicator 20B illustrated in FIG. 1.

Focusing on reception processing, in contrast, signal separator 202 may correspond to controller 20A illustrated in FIG. 1, for example. Controller 20A may include, for example, at least one of resource pool configurator 211, 1st stage SCI receiver 203-1, 2nd stage SCI receiver 203-2, and signal separator 202. Further, receiver 201 may correspond to communicator 20B illustrated in FIG. 1.

Transmitter 218 performs radio transmission processing, such as amplification and up-conversion, on the input signal from signal assigner 217, and transmits the radio signal from an antenna.

Note that the exemplary configuration in FIG. 3 illustrates the demodulator, error correction decoder, error correction encoder, and modulator as individual blocks for each of the Uu link and SL, but some or all of them may be integrated.

Additionally, in the exemplary configuration of terminal 200 described above, the resource pool configuration information is received through the higher layer signaling, but the present disclosure is not limited to this. For example, the resource pool configuration information may be configured in advance to terminal 200 in the specification (standard), SIM, or application layer called Pre-configured.

In this case, terminal 200 may use the pre-configured information without receiving the resource pool configuration from base station 100. For example, terminal 200 may recognize a resource (e.g., slot) available for the Uu link and a resource available for the SL based on the resource pool configuration pre-configured to terminal 200, and may use the recognized information in at least one of signal assigner 217 and signal separator 202, for example.

(Exemplary Operation of Terminal 200)

Next, an exemplary operation of terminal 200 will be described.

Figure 4:
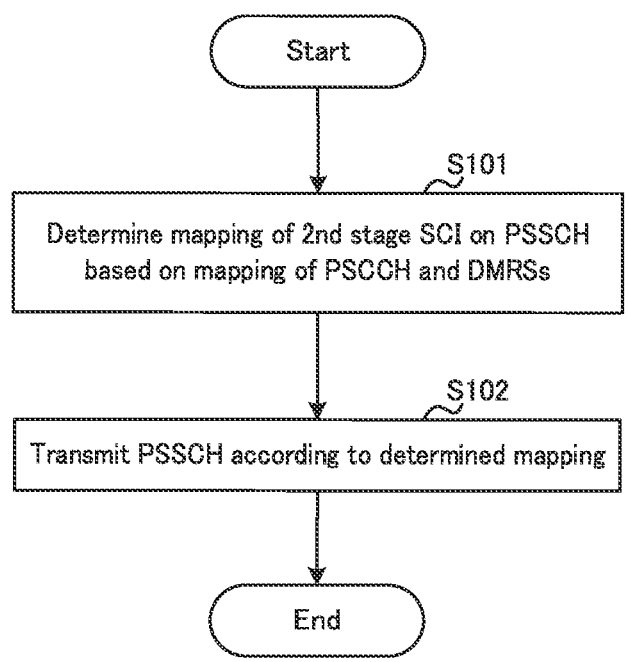
FIG. 4 is a flowchart describing an exemplary (transmission) operation of the terminal.
Figure 5:
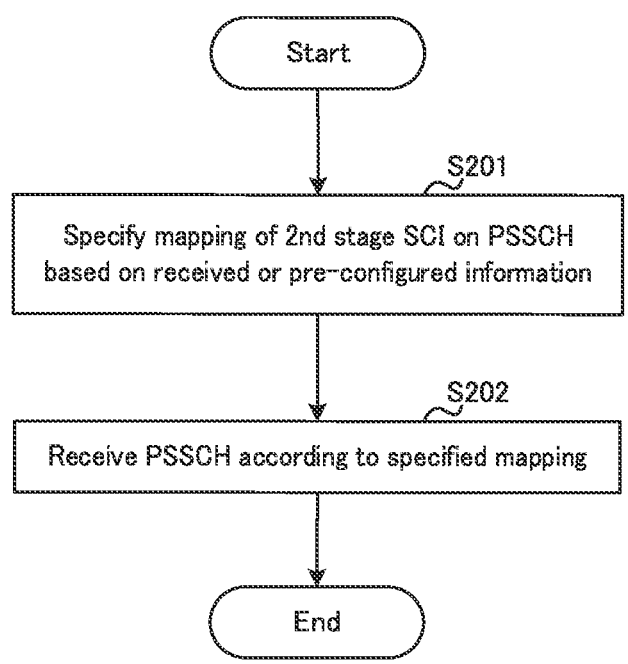
FIG. 5 is a flowchart describing an exemplary (reception) operation of the terminal.

FIG. 4 is a flowchart describing an exemplary operation of terminal 200 focusing on the transmission processing, and FIG. 5 is a flowchart describing an exemplary operation of terminal 200 focusing on the reception processing. The exemplary operations described in FIGS. 4 and 5 may be considered to be exemplary operations in single terminal 200 or in different terminals 200. For example, the exemplary operation described in FIG. 4 may correspond to an exemplary operation in transmitter terminal 200, and the exemplary operation described in FIG. 5 may correspond to an exemplary operation in receiver terminal 200.

As illustrated in FIG. 4, terminal 200 determines mapping of SCI (e.g., 2nd stage SCI) on a PSSCH based on mapping of a PSCCH on the PSSCH and mapping of DMRSs on the PSSCH (S101). Then, terminal 200 transmits the PSSCH including the SCI according to the determined mapping (S102).

In addition, as illustrated in FIG. 5, terminal 200 determines (specifies, recognizes, or identifies) the mapping of the SCI (e.g., 2nd stage SCI) on the PSSCH based on information that is received from another terminal 200 or base station 100 or pre-configured to terminal 200 and that can specify (recognize or identify) the mapping of the SCI on the PSSCH (S201). Then, terminal 200 receives the SCI mapped to the PSSCH according to the determined mapping (S202).

Embodiment 1

In Embodiment 1, the mapping of the 2nd stage SCI on the PSSCH is determined (changed or controlled) based on the mapping of the PSCCH and the mapping of DMRSs on the PSSCH. For example, the 2nd stage SCI is mapped to a symbol where the DMRS is actually transmitted (i.e., mapped) or available on the PSSCH, or to a symbol adjacent to or around the symbol.

The DMRS is used for channel estimation, and thus higher channel estimation accuracy can be expected in a symbol where the DMRS is mapped and a symbol closer to the symbol where the DMRS is mapped. Accordingly, the above-described mapping of the 2nd stage SCI improves received quality of the 2nd stage SCI.

(Findings that LED to Embodiment 1)

In the SL (e.g., PSSCH), which symbols DMRSs are mapped to may be defined by following Table 1, for example.

TABLE 1

| $l_d$ in symbols | DMRS position I | | | | | |
|---|---|---|---|---|---|---|
| | PSCCH duration 2 symbols Number of PSSCH DMRS | | | PSCCH duration 3 symbols Number of PSSCH DMRS | | |
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

In Table 1, "ld" is a parameter indicating the number of symbols where the PSSCH including the PSCCH is mapped. "l⁻" is a parameter indicating a position (symbol position or symbol number) where the PSSCH is mapped in time domain from the first (or start) symbol of the PSCCH.

In a case where the DMRS of the PSSCH is mapped to the first (or start) symbol of the PSCCH, "l⁻"=1. As exemplified in Table 1, 2 symbols or 3 symbols are configured as the duration of the PSCCH in the time domain. The number or positions of DMRSs mapped per PSSCH may vary depending on the configuration of the duration of the PSCCH (e.g. 2 or 3 symbols).

These configurations may be based on either a method called "pre-configured" or a method called "configured". The "pre-configured" is a method of using pre-configured information according to the configuration in the application layer or SIM, without base station 100 generating configuration information. The "configured" is a method of configuring according to signaling from base station 100. These methods may be collectively referred to as "(pre-)configured" in some cases.

For example, 10, 12, 15, 20, and 25 are considered to be examples of the number of PRBs of the PSCCH. For the PSSCH, allocation in units called sub channels is considered, and the number of PRBs included in one sub channel is considered to be, for example, 10, 15, 20, 25, 50, 75, and 100.

Which configuration to use may be (pre-)configured for each resource pool. For example, frequency resource allocation included in the 1st stage SCI indicates the number of sub channels to be allocated to the PSSCH.

The number of PRBs per sub channel may be the same as the number of PRBs in the PSCCH. For example, in a case where the number of PRBs per sub channel is 25 PRBs, the number of PRBs in the PSCCH is also 25 PRBs, and a single sub channel is allocated to the PSSCH, the PSCCH is mapped to some of the symbols where the PSCCH can be mapped, and the PSSCH is not mapped to the symbols where the PSCCH is mapped, as illustrated in FIG. 6, for example.

Figure 6:
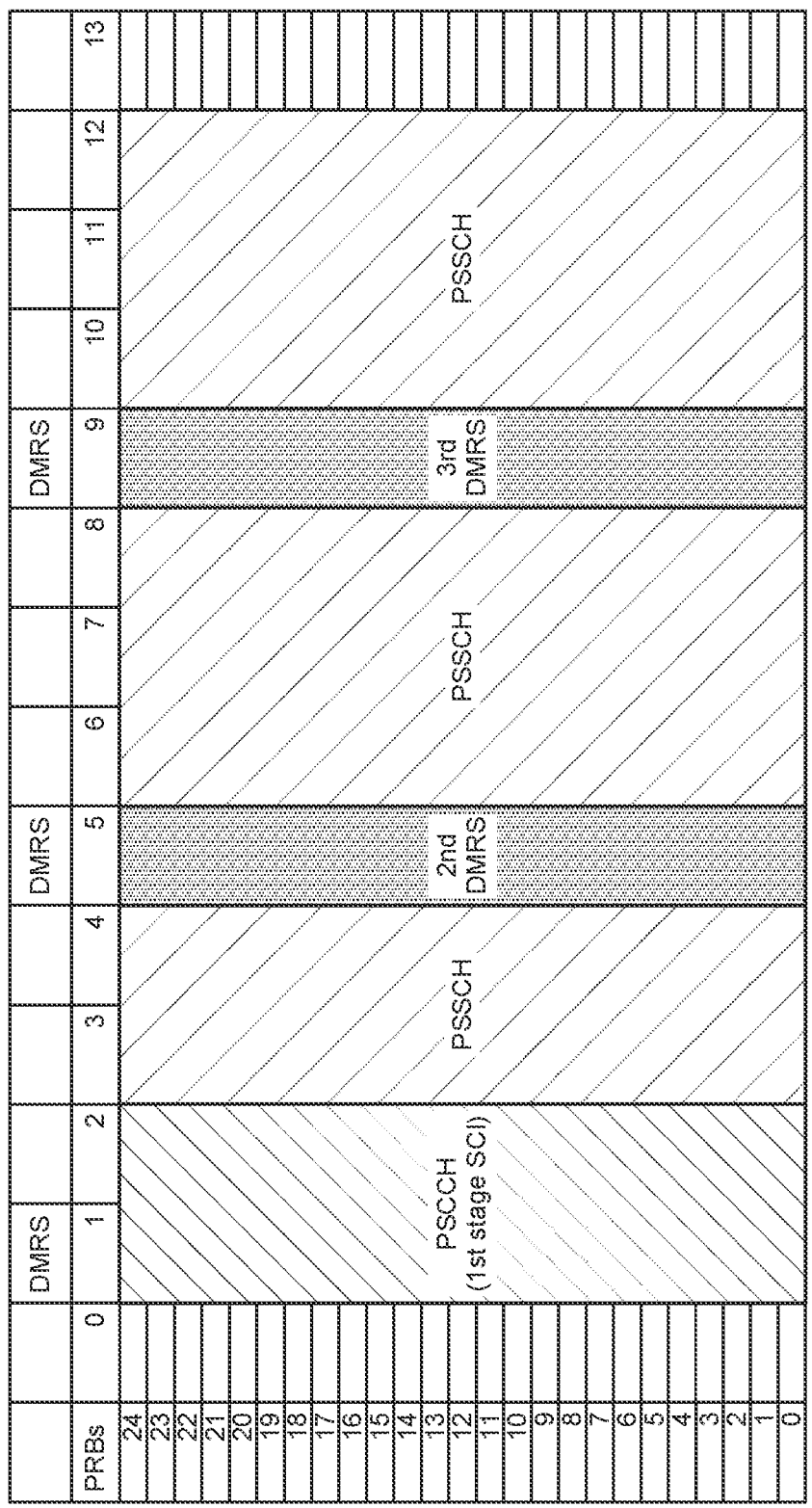
FIG. 6 illustrates an exemplary slot format of a physical SL shared channel (PSSCH) used for sidelink (SL) communication.

FIG. 6 illustrates an example where the number of symbols where the PSSCH can be mapped is configured to 12, the duration of the PSCCH in the time domain (symbol duration or number of symbols) is configured to 2, and the number of DMRSs for the PSSCH is configured to 3.

According to Table 1 above, positions (candidate symbol positions) where the DMRSs are mapped are "l⁻"=1st, 5th, and 9th symbols. However, the PSCCH is mapped to the symbol "l⁻"=1, accordingly, the PSSCH is not mapped there. Thus, the DMRS is not mapped to the symbol "l⁻"=1 either.

As described above, the DMRS of the PSSCH may not actually be mapped although it is present in the configuration exemplified in Table 1. Note that the situation where the candidate symbol positions are configured to the DMRSs as exemplified in Table 1 may be interpreted as the situation where symbols, which are exemplary time resources, are allocated to the DMRSs. The DMRS, however, may be mapped to a symbol different from that in the configuration of the candidate symbol positions (e.g., symbol not allocated to DMRS).

Incidentally, the 2nd stage SCI is considered to be mapped to the PSSCH, and the DMRS of the PSSCH is considered to be used for demodulation of the 2nd stage SCI. Since the 2nd stage SCI is used for receiving (e.g., demodulating) the PSSCH, it is preferable to be mapped to a symbol as forward as possible in the time domain. Thus, it is considered that the 2nd stage SCI is mapped around the 1st DMRS.

However, in the case where the number of PRBs in the PSCCH is the same as the number of PRBs in one sub channel and the allocation of the PSSCH is one sub channel as illustrated in FIG. 6, the 1st DMRS, which is supposed to be a reference, is not mapped, so that mapping of the 2nd stage SCI is unclear on the reception side of the SL communication.

When the reception (e.g., demodulation or decoding) of the 2nd stage SCI fails because of the unclear mapping of the SCI in the SL communication, the reception success rate of the PSSCH signal (e.g., data signal) is deteriorated. Accordingly, the reliability required for the SCI is higher than that for the data signal transmitted by the PSCCH. It is thus expected to enhance the reliability of the mapping of the 2nd stage SCI in the PSSCH (in other words, the reliability of the reception of the SCI).

Operation Example 1-1

With this regard, in Embodiment 1, for example, transmitter terminal 200 maps the 2nd stage SCI around any one of one or more DMRSs (available DMRSs) that are actually transmitted (or mapped), e.g., a DMRS mapped to a symbol with the smallest symbol number.

When the 1st DMRS is not actually transmitted, this mapping allows the 2nd stage SCI to be mapped around a different (2nd) DMRS that is actually transmitted. In other words, it is possible to clarify the operation (mapping of the 2nd stage SCI) in the case where the 1st DMRS is not actually transmitted. Note that the expression that "DMRS is not transmitted" may be replaced by the expression that "DMRS is dropped".

Operation Example (or mapping example) 1-1 will be described with reference to FIG. 7. In Operation Example 1-1, the configuration is the same as the example in FIG. 6, and the vertical column in FIG. 7 indicates the number (or indices) of the PRBs that compose one sub channel. The numbers at the bottom of the horizontal row in FIG. 7 indicate the numbers of symbols where the PSSCH can be mapped, and the numbers on the top of the horizontal row in FIG. 7 indicate the mapping order of signals or information such as the PSCCH, PSSCH, DMRS, and 2nd stage SCI for the 12 symbols where the PSSCH can be mapped. FIG. 8 to FIG. 16, which will be described later, are illustrated in the same manner.

Figure 7:
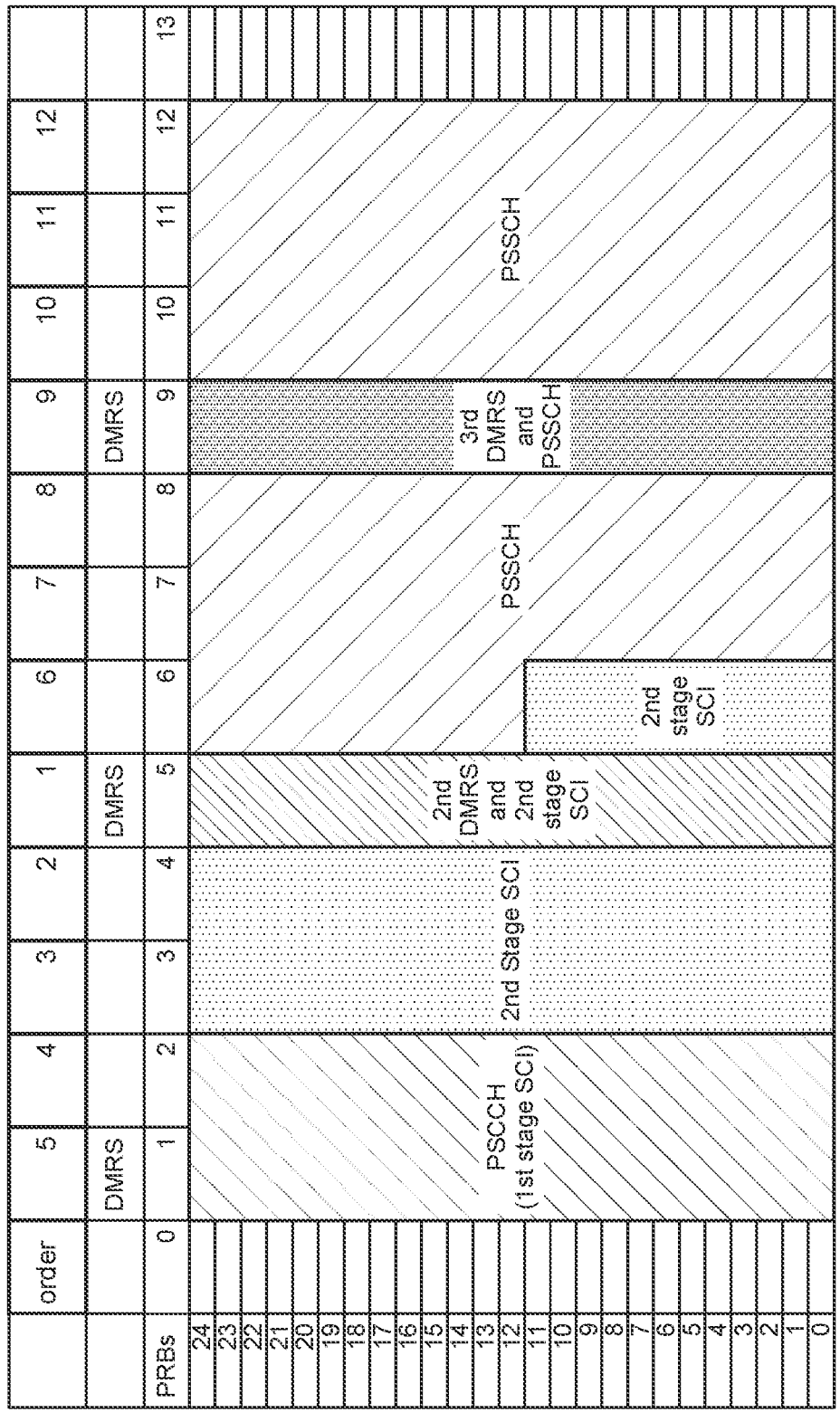
FIG. 7 is a diagram for describing Operation Example (mapping example) 1-1 according to Embodiment 1.

In the example of FIG. 7, the PSCCH is mapped to the candidate symbol position ("l⁻"=1) for the 1st DMRS among the three candidate symbol positions ("l⁻"=1, 5, and 9) for the DMRS, and thus the 1st DMRS is not mapped (transmitted). In this case, the 2nd stage SCI is mapped with reference to the 2nd DMRS that is mapped (actually transmitted), for example, to the second candidate symbol position ("l⁻"=5).

"Mapping with reference to a DMRS" may mean, for example, mapping to one or more symbols located at least one of before and/or after the symbol where the DMRS is mapped in the time domain. Further, "mapping with reference to a DMRS" may include mapping the 2nd stage SCI to the symbol where the DMRS is mapped.

For example, in the symbol where a DMRS is mapped, the DMRS may be mapped to not all the subcarriers but some of the subcarriers among a plurality of subcarriers (e.g., 12 subcarriers) composing the PRB.

In this case, in the PRB where the DMRS is mapped, the DMRS may be mapped to some subcarriers and the 2nd stage SCI may be mapped to all or some of the remaining subcarriers. The subcarrier is also called a resource element (RE), and such mapping is also called frequency division multiplexing (FDM) in units of REs.

Thus, "mapping with reference to a DMRS" is not limited to mapping in the time domain, and may include mapping to one or more REs located at least one of the low frequency side and/or the high frequency side from the RE where the DMRS is mapped in the frequency domain.

In Operation Example 1-1, the 2nd stage SCI is mapped with reference to a symbol where the 2nd DMRS is actually mapped in the PSSCH. This allows the 2nd stage SCI to be mapped around a DMRS even when the 1st DMRS is not transmitted.

"Around a DMRS" may mean a resource (e.g., at least one of a symbol and RE) that is relatively close to the DMRS (actually) mapped in the PSSCH. Focusing on the FDM in units of REs, the "resource relatively close to a DMRS" may mean an RE that is relatively close to the DMRS in the frequency direction in the symbol where the DMRS is mapped. Thus, "around a DMRS" may be a notion including a "symbol where the DMRS is mapped".

The meanings of the above-described expressions "mapping with reference to a DMRS" and "around a DMRS" are the same in the descriptions including other embodiments to be described later.

Note that the 2nd DMRS is an expression based on the candidate symbol positions of mapping in the PSSCH, and another expression may be used, such as the first DMRS to be actually transmitted (mapped) in the PSSCH (available 1st DMRS).

In addition, the number of REs to be used for the mapping of the 2nd stage SCI may be determined based on at least one of the values (e.g., α and β) to be "(pre-)configured" and information of the size of the 2nd stage SCI format (format size) indicated by the 1st stage SCI. For example, "α" may be a parameter configured using higher layer signaling, and "β" may be a parameter indicated by the 1st stage SCI.

In Operation Example (mapping example) 1-1, the 2nd stage SCI is mapped according to the following order (or rule).

(a1) First DMRS transmitted in a PSSCH slot (available 1st DMRS)

(a2) Symbols before the DMRS of (a1), from a larger symbol number to a smaller symbol number (a3) Symbols after the DMRS of (a1), from a smaller symbol number to a larger symbol number Such a mapping method makes it possible to determine a resource where the 2nd stage SCI is mapped by a consistent mapping rule in a case where the number of DMRSs to be mapped to the PSSCH varies depending on mapping of the PSCCH.

In the example of FIG. 7, a DMRS is mapped to the symbol position "l⁻"=5, where the PSCCH is not mapped, among the candidate symbol positions for the DMRS "l⁻"=1, 5, and 9 (see Table 1); accordingly, the available 1st DMRS in the above (a1) corresponds to the 2nd DMRS. Thus, the 2nd stage SCI is first mapped (frequency-multiplexed) to the symbol where the 2nd DMRS is mapped.

In a case where there is the 2nd stage SCI that cannot be mapped to the symbol where the 2nd DMRS is mapped, the 2nd stage SCI is mapped to symbols before the symbol where the 2nd DMRS is mapped in descending order of the symbol number (l⁻) so as not to overlap with the PSCCH, in accordance with the above (a2). In the example of FIG. 7, the 2nd stage SCI that cannot be mapped in the symbol where the 2nd DMRS is mapped is mapped to two symbols (2×25 PRBs=50 PRBs) in the order from the symbol number=4 to the symbol number=3.

In a case where there still is the 2nd stage SCI that cannot be mapped, the 2nd stage SCI is mapped to symbols after the symbol where the 2nd DMRS is mapped in ascending order of the symbol number, in accordance with the above (a3). In the example of FIG. 7, the 2nd stage SCI is mapped to the symbol with the symbol number=6 (12 PRBs with the PRB numbers=0 to 11).

Figure 8:
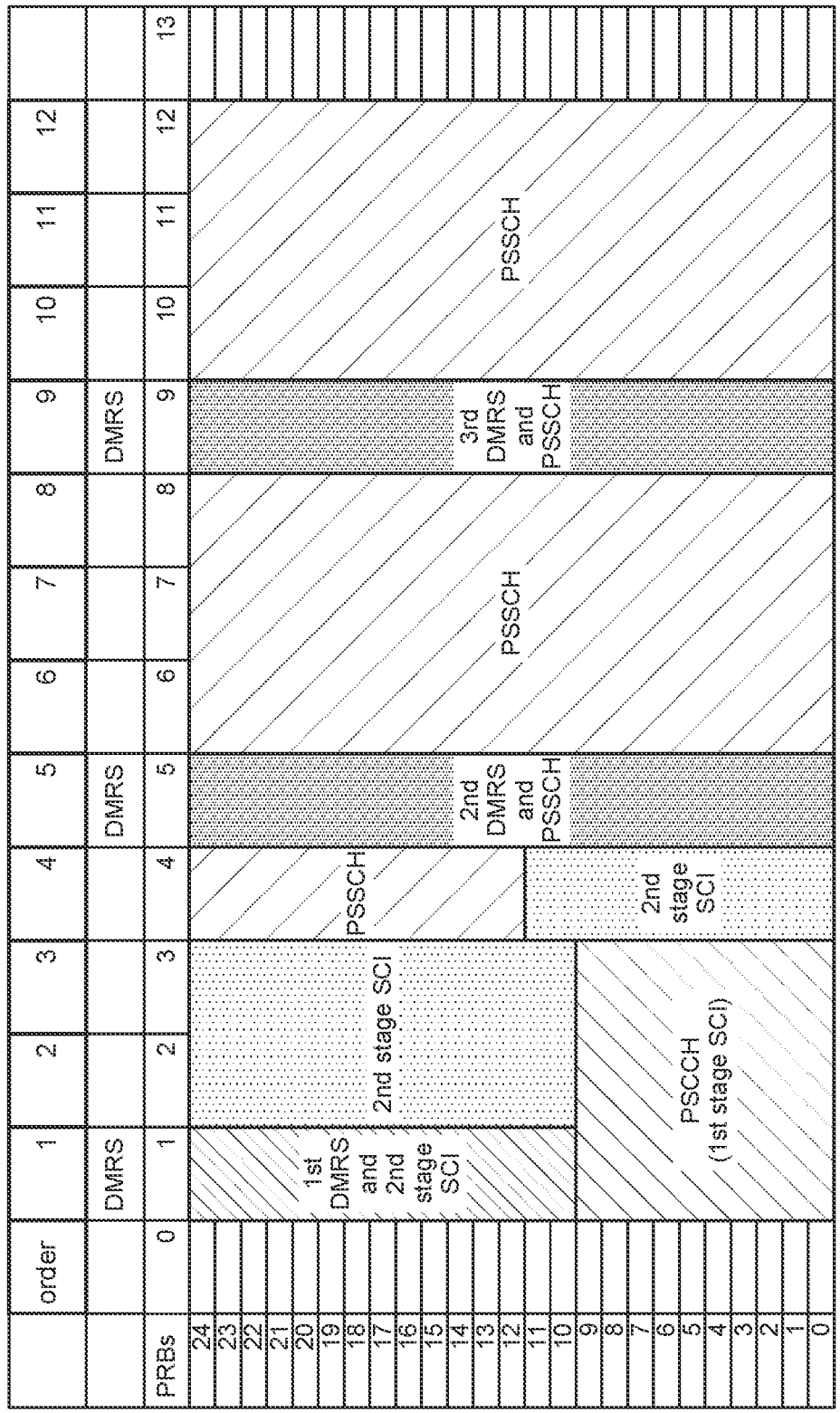
FIG. 8 is another diagram for describing Operation Example (mapping example) 1-1 according to Embodiment 1.

As another example, FIG. 8 assumes a case where the PSCCH is mapped to 10 PRBs in three symbols with the symbol numbers=1 to 3, the number of PRBs per sub channel is 25 PRBs, and the candidate symbol positions for the DMRS are three symbols with "l⁻"=1, 5, and 9 (see Table 1).

In the example of FIG. 8, the 1st DMRS is mapped to, for example, 15 PRBs with the PRB numbers 10 to 24 in the symbol with the symbol number "l⁻"=1. In other words, the 1st DMRS is frequency-multiplexed with the PSCCH in the symbol with the symbol number=1 and transmitted.

In this case, according to the order of (a1) to (a3) described above, the 2nd stage SCI is first mapped to the PRBs where the PSCCH is not mapped in the symbol with the symbol number=1 where the 1st DMRS is mapped.

Then, in a case where there is the 2nd stage SCI that cannot be mapped to the symbol where the 1st DMRS is mapped, the 2nd stage SCI is mapped to symbols after the symbol where the 1st DMRS is mapped and the PSCCH is not mapped in ascending order of the symbol number, since the symbol where the 1st DMRS is mapped is a start symbol.

In the example of FIG. 8, the 2nd stage SCI is mapped to the PRBs (15 PRBs with PRB numbers=10 to 24) where the PSCCH is not mapped in each of the two symbols with the symbol number=2 and the symbol number=3. Further, in a case where there still is the 2nd stage SCI that cannot be mapped, the 2nd stage SCI is mapped to the PRBs (e.g., 12 PRBs with PRB numbers=0 to 11) where the PSCCH is not mapped in the symbol with the following symbol number=4.

Figure 9:
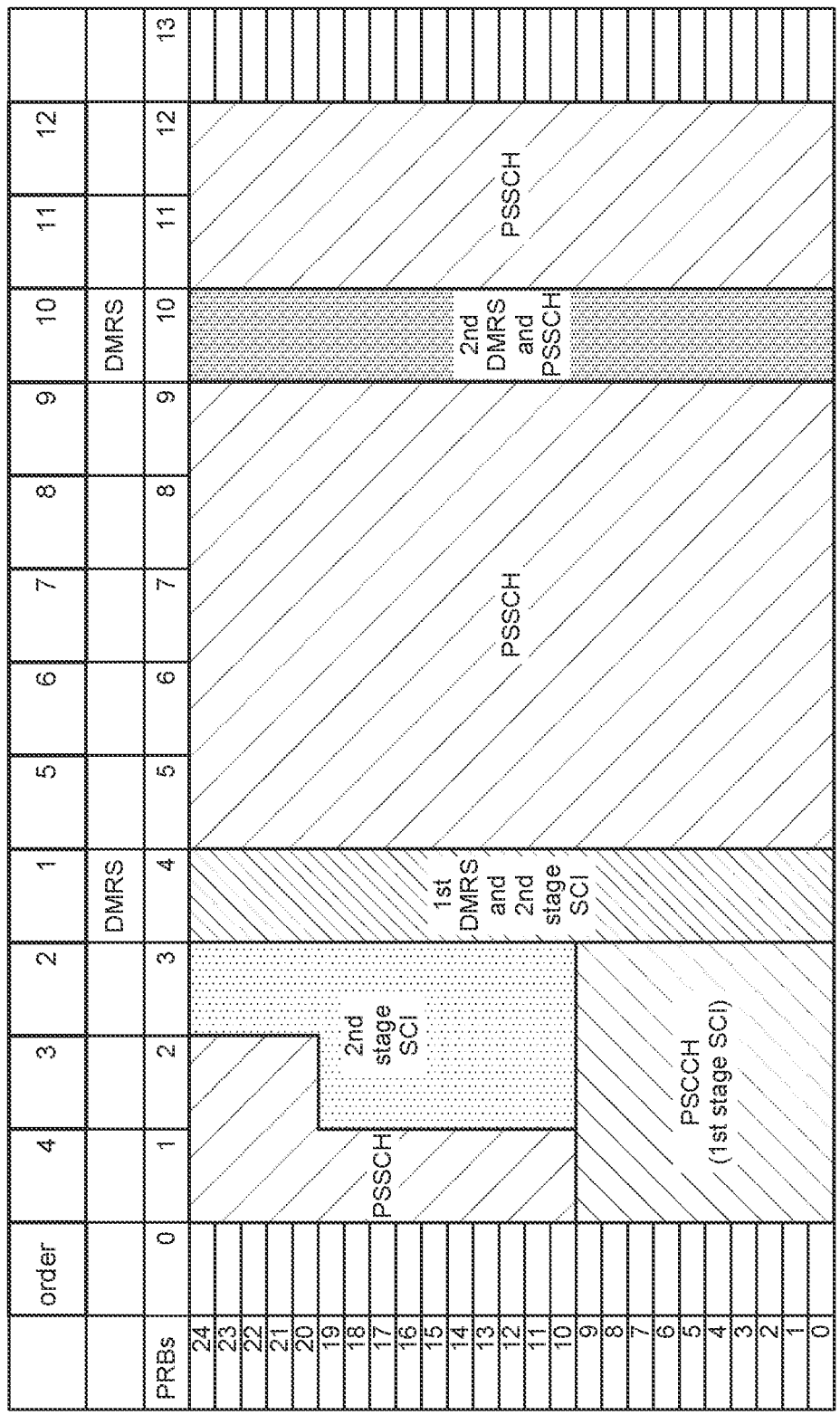
FIG. 9 is still another diagram for describing Operation Example (mapping example) 1-1 according to Embodiment 1.

Further, as yet another example. FIG. 9 assumes a case where the PSCCH is mapped to 10 PRBs in three symbols with the symbol numbers=1 to 3, the number of PRBs per sub channel is 25 PRBs, and the candidate symbol positions for the DMRS are two symbols with "l⁻"=4 and 10 (see Table 1).

In this case, the 1st DMRS is mapped to a symbol ("l⁻"=4) after the three symbols with the symbol numbers=1 to 3 where the PSCCH is mapped. Thus, the 2nd stage SCI is first mapped (frequency-multiplexed) to the 1st DMRS symbol according to the order of (a1) to (a3) described above.

Then, the 2nd stage SCI that cannot be mapped to the 1st DMRS symbol is mapped to PRBs where the PSCCH is not mapped in symbols before the 1st DMRS symbol in descending order of the symbol number. In the example of FIG. 9, the 2nd stage SCI is mapped to the PRBs (15 PRBs+10 PRBs=25 PRBs) where the PSCCH is not mapped in the two symbols with the symbol number=3 and the symbol number=2.

Note that, in the mapping examples illustrated in FIGS. 7 to 9, the order (in the frequency direction) in which the 2nd stage SCI is mapped in symbols where the PSCCH is not mapped may be ascending order or descending order of the PRB number. FIGS. 7 to 9 are examples where the 2nd stage SCI is mapped in ascending order of the PRB number.

Operation Example 1-2

Next, Operation Example (or mapping example) 1-2 will be described with reference to FIG. 10. In Operation Example 1-2, the 2nd stage SCI is mapped according to the following order (or rule).
  (b1) First DMRS transmitted in a PSSCH slot (available 1st DMRS)
  (b2) Symbol immediately after the DMRS of (b1)
  (b3) Symbols before the DMRS of (b1), from a larger symbol number to a smaller symbol number
  (b4) Symbols after the DMRS of (b1), from a smaller symbol number to a larger symbol number Operation Example 1-2 is different from Operation Example 1-1 in that the 2nd stage SCI is mapped to a symbol immediately after the first DMRS to be transmitted prior (i.e., preferentially) to the forward symbol.

Figure 10:
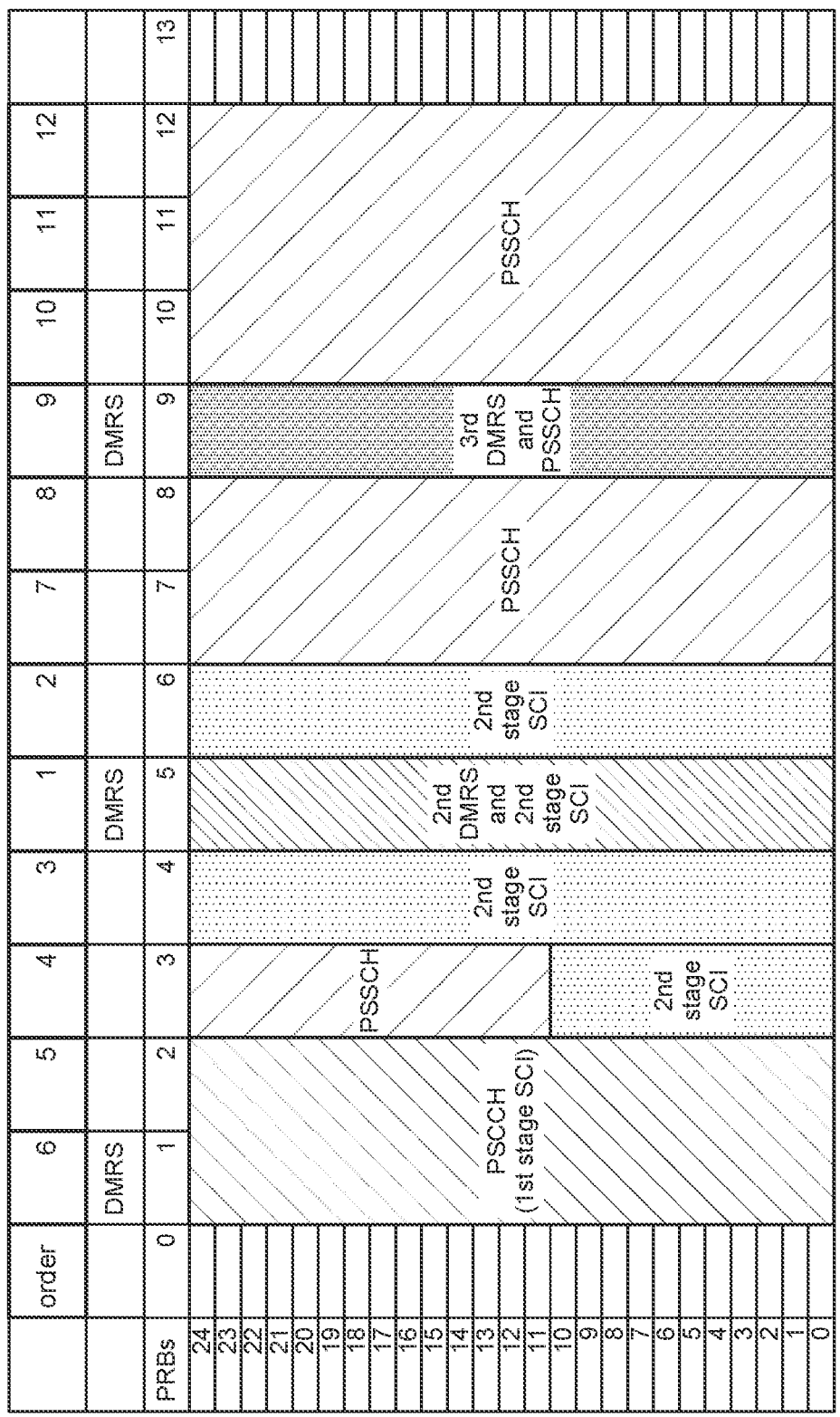
FIG. 10 is a diagram for describing Operation Example (mapping example) 1-2 according to Embodiment 1.

For example, FIG. 10 assumes a case where the PSCCH is mapped to 25 PRBs in two symbols with symbol numbers=1 and 2, the number of PRBs per sub channels is 25 PRBs, and the candidate symbol positions for the DMRS are three symbols with "l⁻"=1, 5, and 9 (see Table 1) (same as in FIG. 7).

In this case, according to the order of (b1) to (b4) described above, a DMRS is mapped to the symbol position "l⁻"=5, where the PSCCH is not mapped, among the candidate symbol positions for the DMRS "l⁻"=1, 5, and 9 (see Table 1); accordingly, the available 1st DMRS in the above (b1) corresponds to the 2nd DMRS. Thus, the 2nd stage SCI is first mapped (frequency-multiplexed) to the symbol where the 2nd DMRS is mapped.

In a case where there is the 2nd stage SCI that cannot be mapped to the symbol where the 2nd DMRS is mapped, the 2nd stage SCI is mapped to a symbol (symbol number=6) immediately after the symbol where the 2nd DMRS is mapped, in accordance with the above (b2).

Then, in a case where there still is the 2nd stage SCI that cannot be mapped, the 2nd stage SCI is mapped to symbols before the symbol where the 2nd DMRS is mapped in descending order of the symbol number so as not to overlap with the PSCCH, in accordance with the above (b3). In the example of FIG. 10, the 2nd stage SCI is mapped to two symbols (25 PRBs+11 PRBs=36 PRBs) in the order from the symbol number=4 to the symbol number=3. The 2nd stage SCI that cannot be mapped to the symbol is mapped.

Although not illustrated in FIG. 10, in a case where there still is the 2nd stage SCI that cannot be mapped, the 2nd stage SCI is mapped to symbols after the symbol where the 2nd DMRS is mapped (e.g., symbols with the symbol numbers=7 and later) in ascending order of the symbol number, in accordance with the above (b4).

Such a mapping method allows the 2nd stage SCI to be preferentially mapped to a symbol immediately after and before (adjacent to) the first DMRS to be transmitted, thereby improving channel estimation accuracy using the DMRS for the 2nd stage SCI.

In a case where the 2nd stage SCI cannot be mapped to symbols adjacent to the first DMRS to be transmitted, the 2nd stage SCI is preferentially mapped to a symbol before the first DMRS to be transmitted, and this makes the timing of starting reception of the 2nd stage SCI earlier. Thus, the processing delay regarding the 2nd stage SCI can be reduced.

In the example of FIG. 10, the reception of the 2nd stage SCI can be completed at a symbol with the symbol number=6 (symbol immediately after the 2nd DMRS), so that receiver terminal 200 can start demodulating (and decoding) the 2nd stage SCI at a timing corresponding to the symbol number=6.

Operation Example 1-3

Figure 11:
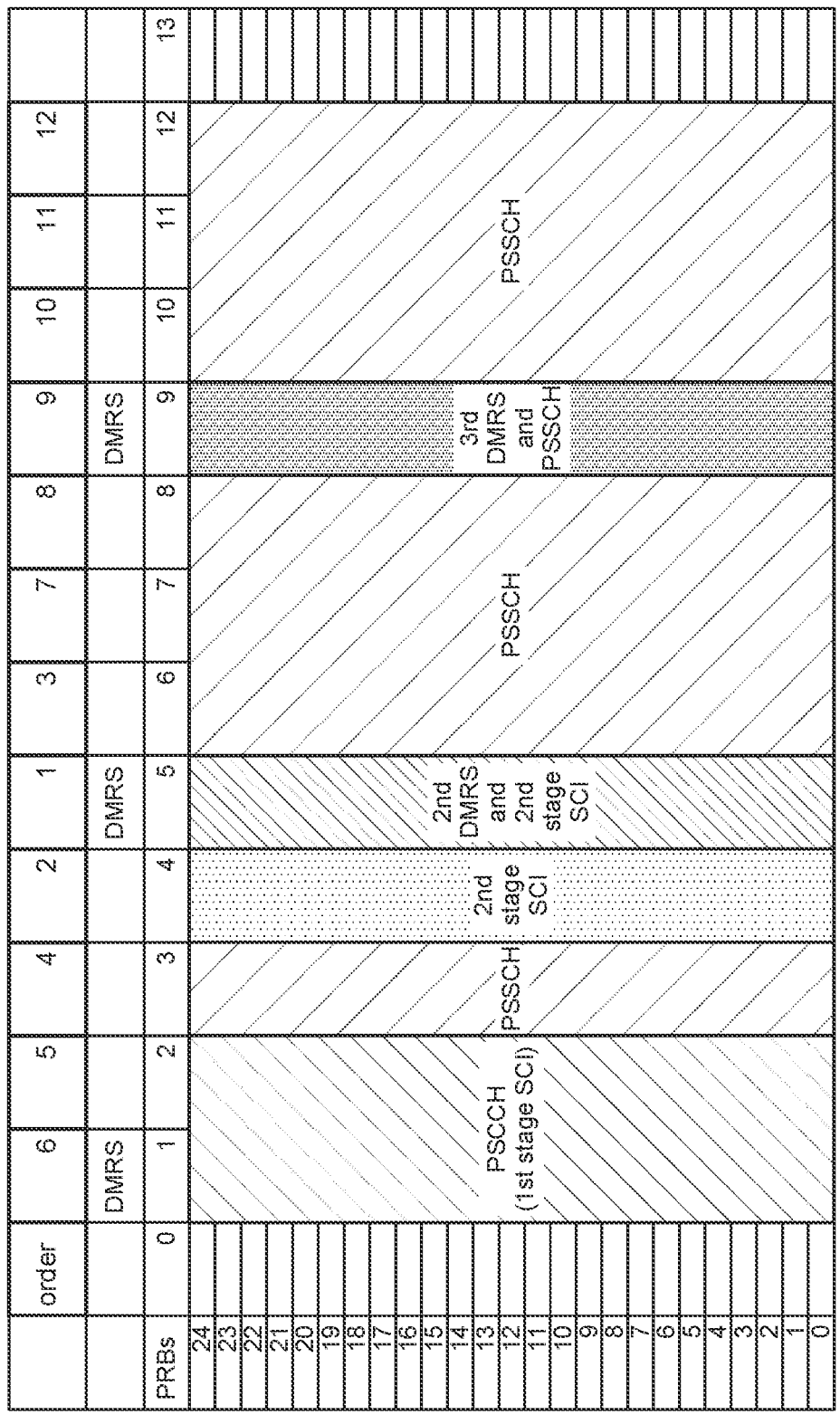
FIG. 11 is a diagram for describing Operation Example (mapping example) 1-3 according to Embodiment 1.

Next, Operation Example 1-3 will be described with reference to FIG. 11. Operation Example 1-3 corresponds to a variation of Operation Example 1-2 described above. In Operation Example 1-3, the 2nd stage SCI is mapped to a symbol immediately before the first DMRS to be transmitted (available 1st DMRS) prior (i.e., preferentially) to a symbol immediately after the DMRS.

For example, in Operation Example 1-3, the 2nd stage SCI is mapped according to the following order (or rule).
  (c1) First DMRS transmitted in a PSSCH slot (available 1st DMRS)
  (c2) Symbol immediately before the DMRS of (c1)
  (c3) Symbol immediately after the DMRS of (c1)
  (c4) From a symbol located two symbols before the DMRS of (c1), from a larger symbol number to a smaller symbol number
  (c5) From a symbol located two symbols after the DMRS of (c1), from a smaller symbol number to a larger symbol number For example, FIG. 11 assumes a case where the PSCCH is mapped to 25 PRBs in two symbols with symbol numbers=1 and 2, the number of PRBs per sub channels is 25

PRBs, and the candidate symbol positions for the DMRS are three symbols with "l⁻"=1, 5, and 9 (see Table 1) (same as in FIG. 7).

In this case, according to the order of (c1) to (c4) described above, a DMRS is mapped to the symbol position "l⁻"=5, where the PSCCH is not mapped, among the candidate symbol positions for the DMRS "l⁻"=1, 5, and 9 (see Table 1); accordingly, the available 1st DMRS in the above (c1) corresponds to the 2nd DMRS. Thus, the 2nd stage SCI is first mapped (frequency-multiplexed) to the symbol where the 2nd DMRS is mapped.

In a case where there is the 2nd stage SCI that cannot be mapped to the symbol where the 2nd DMRS is mapped, the 2nd stage SCI is mapped to a symbol (symbol number=4) immediately before the symbol where the 2nd DMRS is mapped, in accordance with the above (c2).

In some cases, the mapping of the 2nd stage SCI is completed here in the above symbol of (c2) (e.g., symbol with symbol number=4 in FIG. 11) depending on the size of the 2nd stage SCI. In this case, the symbol position where the reception of the 2nd stage SCI is completed can be configured before the first DMRS to be transmitted (2nd DMRS) in contrast to Operation Example 1-2.

Thus, receiver terminal 200 sometimes can start demodulating (and decoding) the 2nd stage SCI earlier (e.g., timing corresponding to symbol number=4) than the timing in Operation Example 1-2.

Note that, when the mapping of the 2nd stage SCI is not completed in the above symbol of (c2), the 2nd stage SCI is mapped to a symbol immediately after the symbol where the 2nd DMRS is mapped, in accordance with the above (c3). The 2nd stage SCI that cannot be mapped by (c3) is mapped from a symbol located two symbols before the 2nd DMRS in descending order, in accordance with (c4).

The 2nd stage SCI that cannot be mapped by (c4) is mapped from a symbol located two symbols after the 2nd DMRS in ascending order, in accordance with (c5).

As described above, in Operation Example 1-3, the 2nd stage SCI is preferentially mapped to the symbol of the first DMRS to be transmitted, then to a symbol immediately before the symbol among the two symbols immediately before and after (adjacent to) the symbol. Further, when there still is the 2nd stage SCI that cannot be mapped to the symbol immediately after the symbol of the first DMRS to be transmitted, the 2nd stage SCI is preferentially mapped to a symbol located before the symbol immediately before the first DMRS to be transmitted.

Thus, receiver terminal 200 is more likely to complete the reception of the 2nd stage SCI and start demodulating (and decoding) the 2nd stage SCI earlier than the timing in Operation Example 1-2.

Note that (c4) and (c5) may be in the opposite order.

Operation Example 1-4

Next, Operation Example (or mapping example) 1-4 will be described with reference to FIG. 12. For example, in Operation Example 1-4, the 2nd stage SCI is mapped according to the following order (or rule).

(d1) First DMRS transmitted in a PSSCH slot (available 1st DMRS)
(d2) Symbols after (d1), from a smaller symbol number to a larger symbol number In Operation Example 1-4, the 2nd stage SCI is mapped to a symbol of the first DMRS to be transmitted and one or more subsequent symbols, and not mapped to a symbol before the symbol of the first DMRS to be transmitted.

Figure 12:
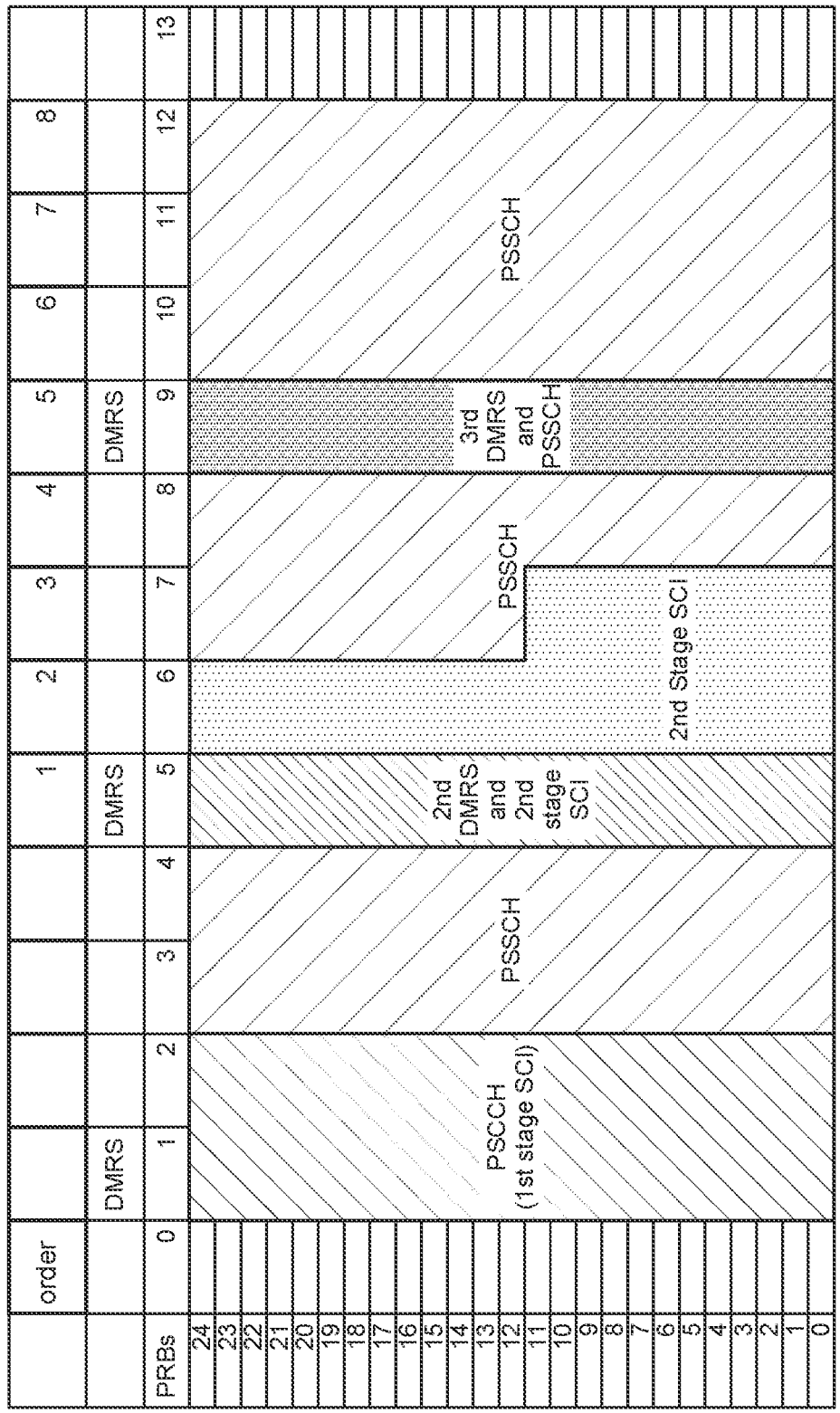
FIG. 12 is a diagram for describing Operation Example (mapping example) 1-4 according to Embodiment 1.

For example, FIG. 12 assumes a case where the PSCCH is mapped to 25 PRBs in two symbols with symbol numbers=1 and 2, the number of PRBs per sub channels is 25 PRBs, and the candidate symbol positions for the DMRS are three symbols with "l⁻"=1, 5, and 9 (see Table 1) (same as in FIG. 7).

In this case, according to the order of (d1) and (d2) above, a DMRS is mapped to the symbol position "l⁻"=5, where the PSCCH is not mapped, among the candidate symbol positions for the DMRS "l⁻"=1, 5, and 9 (see Table 1); accordingly, the available 1st DMRS in the above (d1) corresponds to the 2nd DMRS. Thus, the 2nd stage SCI is first mapped (frequency-multiplexed) to the symbol where the 2nd DMRS is mapped.

In a case where there is the 2nd stage SCI that cannot be mapped to the symbol where the 2nd DMRS is mapped, the 2nd stage SCI is mapped to symbols (e.g., two symbols with symbol numbers=6 and 7) after the symbol where the 2nd DMRS is mapped, in accordance with the above (d2). Note that FIG. 12 illustrates an example of mapping the 2nd stage SCI to 25 PRBs in the symbol with the symbol number=6 and 12 PRBs (PRB numbers=0 to 11) in the symbol with the symbol number=7.

Note that, in Operation Example 1-4, the order (in the frequency direction) in which the 2nd stage SCI is mapped in symbols where the PSCCH is not mapped may be ascending order or descending order of the PRB number. FIG. 12 is an example where the 2nd stage SCI is mapped in ascending order of the PRB number.

Operation Example 1-4 makes it possible to align the timing of starting the reception of the 2nd stage SCI and the timing of starting the reception of the DMRS used for demodulating the 2nd stage SCI (in other words, to minimize the timing difference), from the viewpoint of receiver terminal 200. This, for example, reduces the duration of buffering the 2nd stage SCI in receiver terminal 200.

Operation Example 1-5

Figure 13:
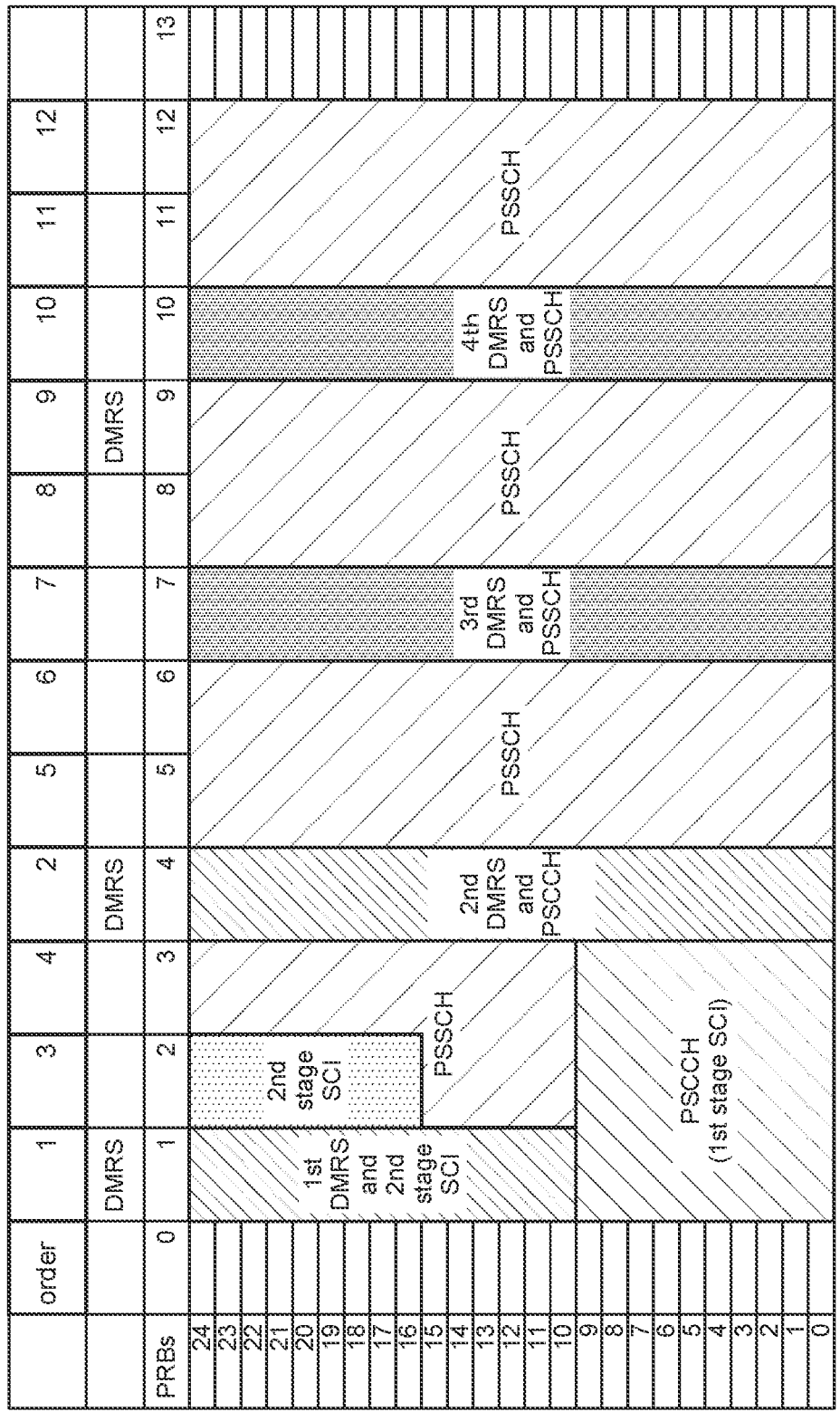
FIG. 13 is a diagram for describing Operation Example (mapping example) 1-5 according to Embodiment 1.

Next, Operation Example 1-5 will be described with reference to FIG. 13. For example, in Operation Example 1-5, the 2nd stage SCI is mapped according to the following order (or rule).

(e1) First DMRS transmitted in a PSSCH slot
(e2) 2nd DRMS when the DMRS of (e1) is the 1st DMRS, and skip when the DMRS of (e1) is the 2nd DMRS
(e3) Symbols before the DMRS of (e1), from a larger symbol number to a smaller symbol number
(e4) Symbols after the DMRS of (e1), from a smaller symbol number to a larger symbol number (except for the symbol of (e2)).

In Operation Example 1-5, in a case where the 1st DMRS is actually transmitted (or mapped) in the PSSCH, the 2nd stage SCI is (e1) mapped to the symbol where the 1st DMRS is mapped, and then (e2) mapped to the symbol where the 2nd DMRS is mapped. In other words, the 2nd stage SCI is mapped to the symbol where the DMRS is mapped (transmitted) in preference to another symbol where the DMRS is not mapped (except for the symbol where the PSCCH is mapped).

The 2nd stage SCI that cannot be mapped to the symbol where the 2nd DMRS is mapped is mapped in accordance with (e3) and (e4). In the example of FIG. 13, (e3) is skipped since (e1) is the 1st DMRS, and the 2nd stage SCI that cannot be mapped to the symbol where the 2nd DMRS is mapped is mapped in ascending order of the symbol number in accordance with (e4).

Higher channel estimation accuracy can be expected in the symbol where the DMRS is mapped and a symbol adjacent to or around the symbol, thereby improving the received quality of the 2nd stage SCI.

For example, in a case where a larger number of DMRS symbols are mapped in a PSSCH slot in Table 1 (e.g., in a case of 3 or 4 symbols instead of 1 or 2 symbols), the 2nd DMRS is mapped to a preceding symbol (e.g., symbol number=5 or 4) in the slot (e.g., 12 symbols).

Thus, preferentially mapping the 2nd stage SCI to the symbol where the (2nd) DMRS is mapped as in Operation Example 1-5, for example, makes it possible to configure the symbol where demodulation of the 2nd stage SCI can be started (i.e., start timing) to the forward section of the slot from the viewpoint of receiver terminal 200. This reduces the delay of the start timing of the reception of the 2nd stage SCI.

Operation Example 1-5 may be applied only when a larger number of DMRS symbols (3 or 4 symbols) are mapped to a PSSCH slot. In addition, Operation Example 1-5 may be applied when the 2nd DMRS is mapped to a symbol before a particular symbol number (symbol #X, where X is an integer greater than or equal to 2) in the PSSCH slot.

In a case where X=6, for example, Operation Example 1-5 may be applied when the 2nd DMRS is mapped to a symbol before the symbol number (DMRS position 1⁻)=6 (e.g., symbol #5 or symbol #4).

Further, (e4) described above may be replaced with, for example, "(e4) Symbols before the DMRS of (e2), from a larger symbol number to a smaller symbol number (except for the symbol of (e1))". In other words, the 2nd stage SCI that cannot be mapped to the 2nd DMRS symbol may be mapped to symbols except for the 1st DMRS symbol in descending order of the symbol number with reference to the 2nd DMRS symbol position.

Embodiment 2

Next, Embodiment 2 will be described. In Embodiment 1, the description has been given with reference to the drawings focusing on the case where the 2nd stage SCI is mapped to PRBs in a symbol in ascending order of the PRB number.

(Findings that LED to Embodiment 2)

Incidentally, it is discussed in the SL design of 3GPP rel. 16 that, for example, a PSCCH is mapped in order from the lowest PRB number in a PSSCH resource allocated to the same slot in the PSCCH.

Assuming such mapping, when the number of PRBs for the PSCCH is less than the number of PRBs for the PSSCH as in FIG. 8, for example, the 2nd stage SCI is possibly mapped to PRBs where the 1st DMRS is not mapped as illustrated in symbol #4.

Receiver terminal 200 does not start demodulating (and decoding) the 2nd stage SCI mapped to the PRBs where the 1st DMRS is not mapped until the 2nd DMRS is received and channel estimation is completed. For example, receiver terminal 200 holds the 2nd stage SCI in a buffer and stands by for demodulating and decoding the 2nd stage SCI until the channel estimation using the received 2nd DMRS is completed. This possibly delays the start timing of demodulating (and decoding) the 2nd stage SCI.

Outline of Embodiment 2

With this regard, in Embodiment 2, the mapping of the 2nd stage SCI in the frequency direction, i.e., to the PRBs is opposite to the order of the mapping of the PSCCH. For example, when the PSCCH is mapped in ascending order of the PRB number, the 2nd stage SCI is mapped in descending order of the PRB number. In contrast, when the PSCCH is mapped in descending order of the PRB number, the 2nd stage SCI is mapped in ascending order of the PRB number.

Such a mapping method makes it possible to preferentially map the 2nd stage SCI to the PRB where the 1st DMRS of the PSSCH is mapped. In other words, it is possible to prevent the 2nd stage SCI from being (preferentially) mapped to a frequency resource where the 1st DMRS of the PSSCH is not mapped due to the mapping of the PSCCH. Thus, receiver terminal 200, for example, can start demodulating (and decoding) the 2nd stage SCI earlier.

Operation Example 2-1

Figure 14:
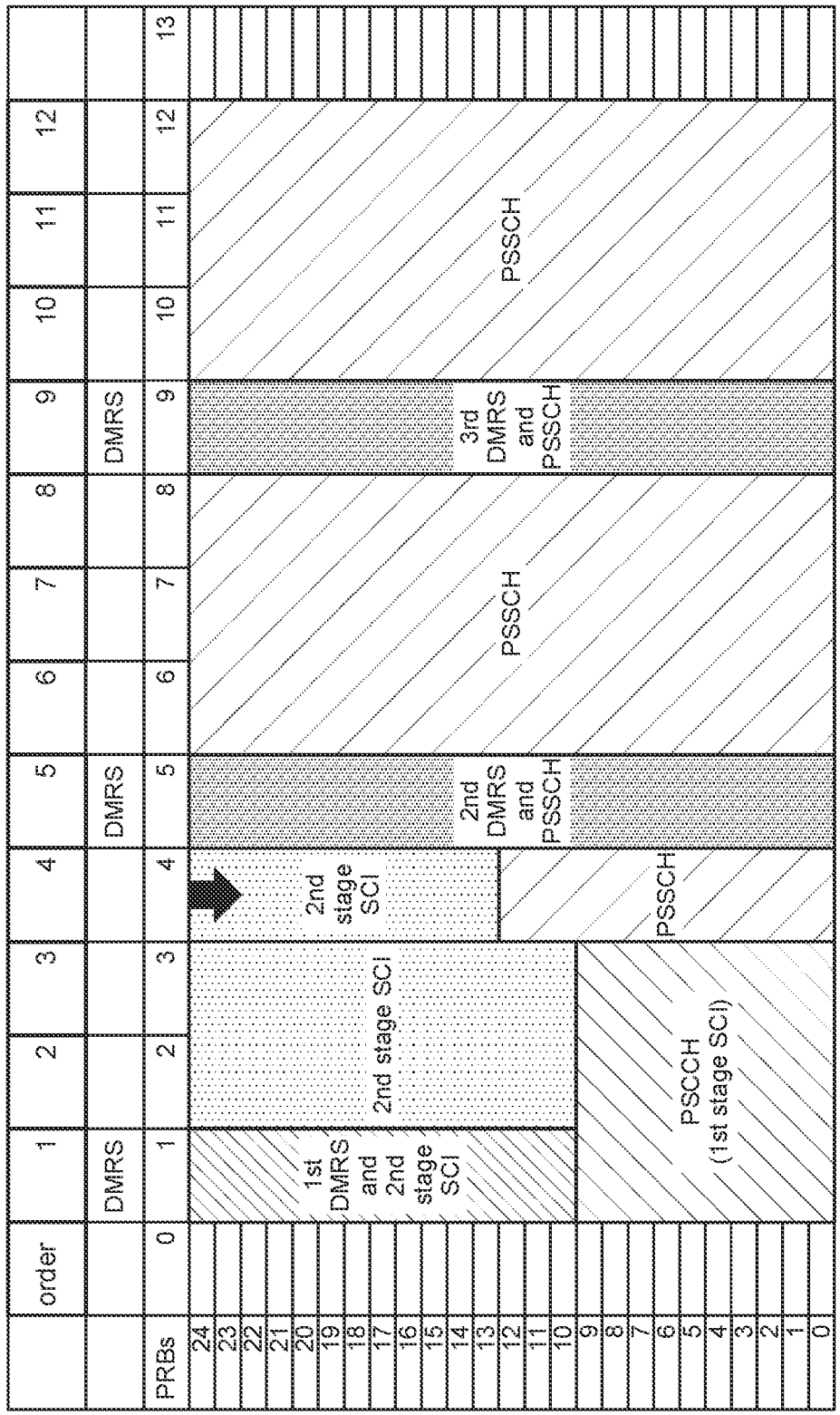
FIG. 14 is a diagram for describing Operation Example (mapping example) 2-1 according to Embodiment 2.

Operation Example 2-1 in Embodiment 2 will be described with reference to FIG. 14. The configuration may be the same as in FIG. 8. In a case where the PSCCH is mapped in ascending order of the PRB number, in Operation Example 2-1, the 2nd stage SCI is mapped to symbol #4 in descending order of the PRB number as indicated by the arrow in FIG. 14.

Since the 2nd stage SCI is mapped to the PRBs in descending order of the PRB number in symbol #4, receiver terminal 200 can start demodulating (and decoding) the 2nd stage SCI without waiting for receiving the 2nd DMRS mapped to symbol #5, for example.

Note that a plurality of DMRSs mapped to the PSSCH slot may be used for the channel estimation, for example. Using the 1st DMRS and 2nd DMRS for the channel estimation, for example, improves the channel estimation accuracy in receiver terminal 200. The number of DMRSs used for the channel estimation may depend on the implementation of receiver terminal (i.e., receiver) 200, for example.

Receiver terminal 200 may perform the channel estimation using a single DMRS (e.g., 1st DMRS), for example, in an environment where receiver terminal 200 observes little channel variation, such as a case where the relative moving speed between transmitter terminal 200 and receiver terminal 200 is low.

The number of DMRSs used for the channel estimation may be adaptively changed according to the radio environment, for example, by the SL communication between terminals 200 or via the communication (Uu link communication) between terminal 200 and base station 100.

Operation Example 2-2

Next, Operation Example 2-2 will be described with reference to FIG. 15. In Operation Example 2-2, in a case where the 1st DMRS is mapped to a symbol where the PSCCH is mapped, the PRBs where the 2nd stage SCI is mapped are configured (e.g., limited to be) within a range of the PRBs where the 1st DMRS is mapped in symbols before the 2nd DMRS. Such a mapping method allows receiver terminal 200 to demodulate (and decode) the 2nd stage SCI using the 1st DMRS before receiving the 2nd DMRS.

Figure 15:
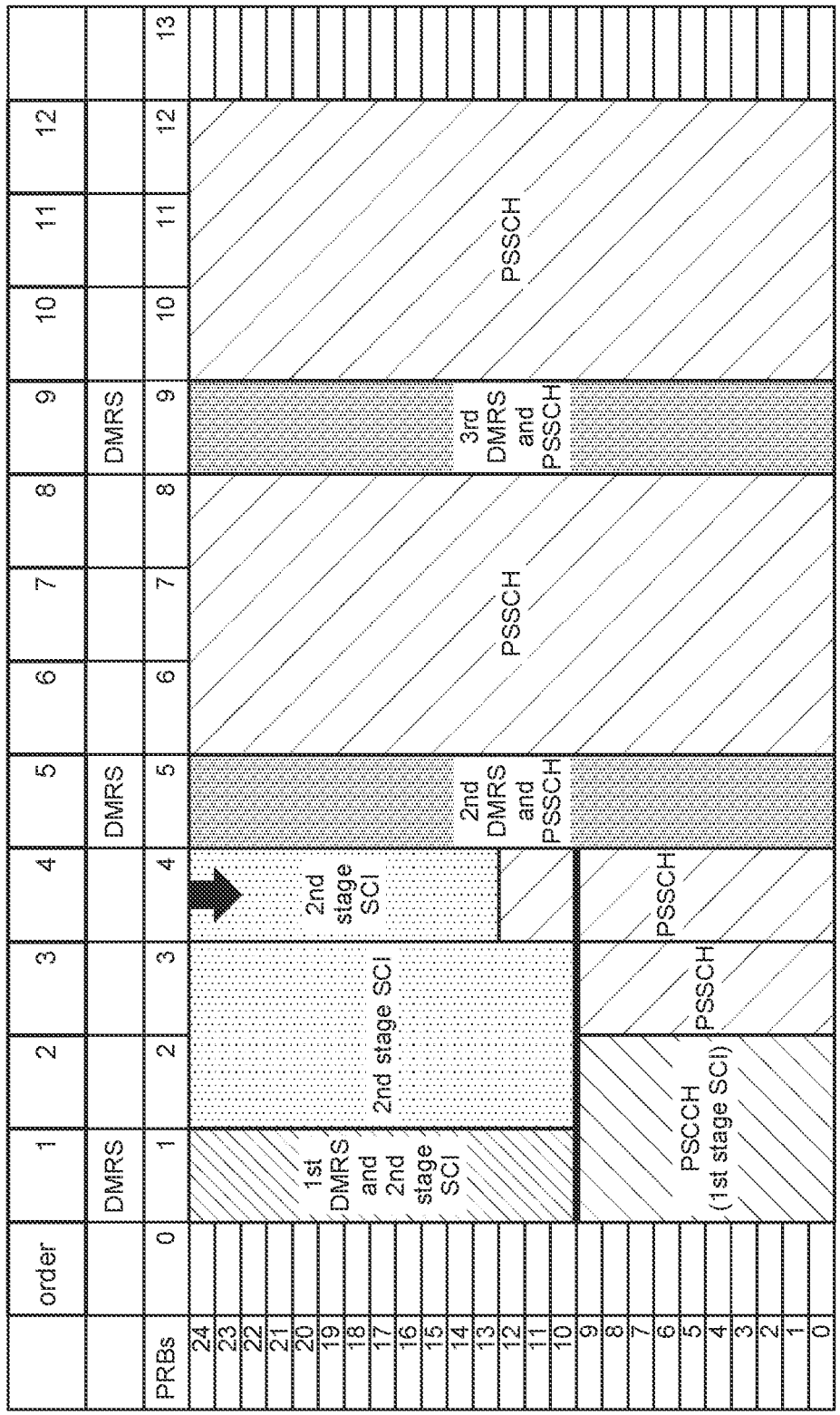
FIG. 15 is a diagram for describing Operation Example (mapping example) 2-2 according to Embodiment 2.

As illustrated in FIG. 15, for example, the PSCCH is mapped to 10 PRBs with the PRB numbers=0 to 9 in symbols #1 and #2, and the PSSCH is mapped to 25 PRBs with the PRB numbers=0 to 25. The 1st DMRS is mapped to 24 PRBs with the PRB numbers 10 to 24, where the PSCCH is not mapped, in symbol #0.

In this case, the 2nd stage SCI is mapped around the 1st DMRS, and the 1st DMRS (of the PSSCH) used to demodulate the 2nd stage SCI is mapped to some of the 25 PRBs (15

PRBs with the PRB numbers=10 to 24). Thus, the 2nd stage SCI is also mapped to some PRBs (with the PRB numbers 10 to 24) of the 25 PRBs as is the case with the mapping of the 1st DMRS.

Note that the demodulation is possible using the 2nd DMRS in a symbol where the 2nd DMRS is mapped or the subsequent symbols, although not illustrated in FIG. 15. Thus, in the symbol where the 2nd DMRS is mapped (e.g., symbol #5) or the subsequent symbols, all PRBs (PRB numbers=0 to 24) of the 25 PRBs may be used for the mapping of the 2nd stage SCI.

It can also be said that the PRBs within a range of the PRB numbers where the 1st DMRS is mapped may be used for the mapping of the 2nd stage SCI in a reference symbol or the preceding symbols in the PSSCH slot, and all PRBs with the PRB numbers where the PSSCH is mapped may be used for the mapping of the 2nd stage SCI in the symbols after the reference symbol.

Operation Example 2-3

Next, Operation Example 2-3 will be described with reference to FIG. 16. In Operation Example 2-3, as in Operation Example 2-2, in a case where the 1st DMRS is mapped to a symbol where the PSCCH is mapped, the 2nd stage SCI may be mapped within the range of the PRB numbers where the 1st DMRS is mapped in symbols before the symbol where the 2nd DMRS is mapped.

In Operation Example 2-2, the PSCCH is mapped in ascending order from the smallest PRB number (or the 2nd stage SCI is mapped in descending order from the largest PRB number) among the PRBs where the PSSCH is mapped. Meanwhile, in Operation Example 2-3, the 2nd stage SCI is mapped in ascending or descending order of the PRB number from a PRB with the middle PRB number among the PRBs where the PSSCH is mapped.

For example, there may be a case where the PSCCH is mapped to the PRBs in a range of the middle PRB numbers among the PRBs where the PSSCH is mapped and the 1st DMRS is mapped to the PRBs excluding the PRBs with the middle PRB numbers. In this case, the 2nd stage SCI is mapped to the PRBs within the range of the PRB numbers where the 1st DMRS is mapped.

Such a mapping method allows receiver terminal 200 to demodulate (and decode) the 2nd stage SCI using the 1st DMRS before receiving the 2nd DMRS, as in Operation Example 2-2.

Figure 16:
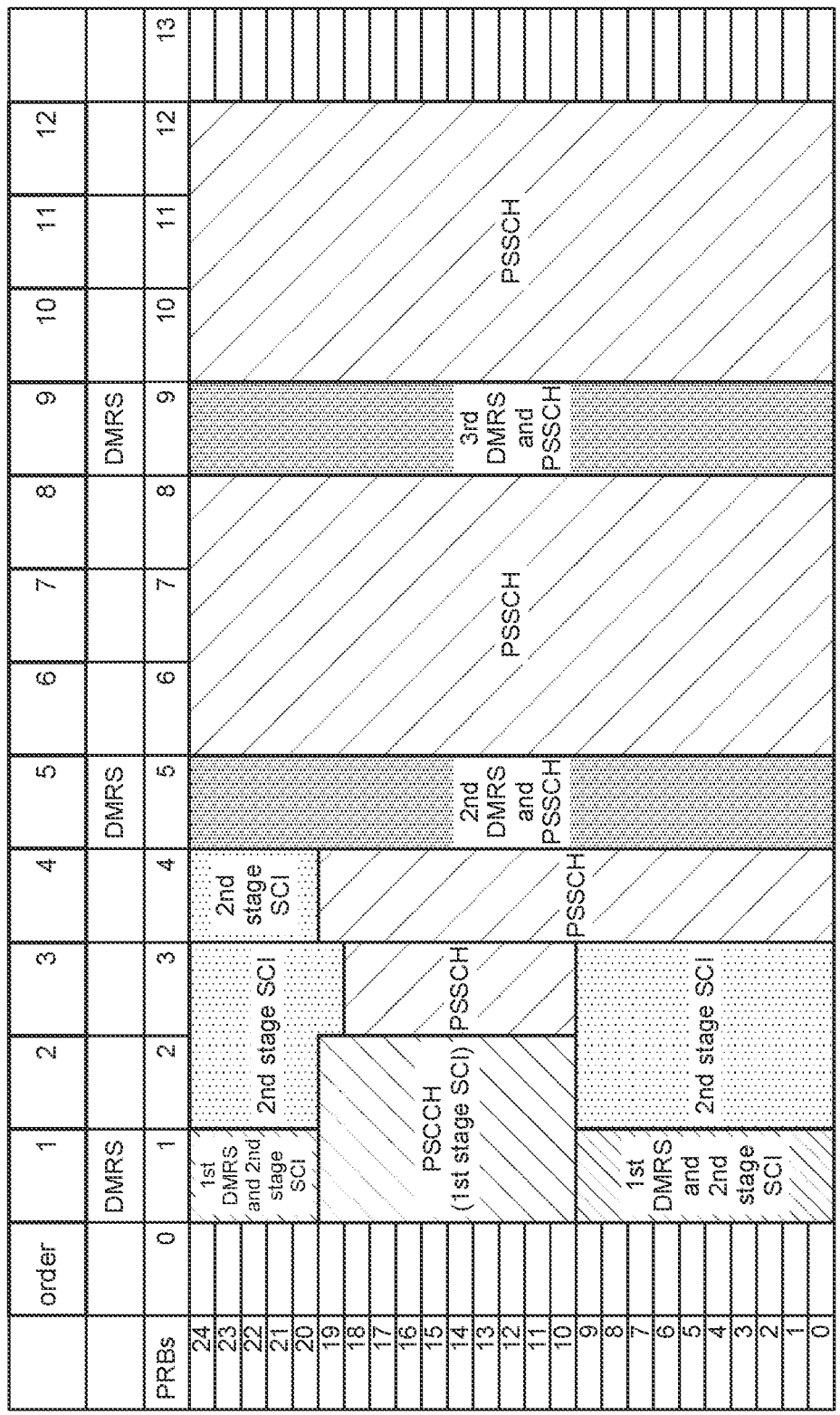
FIG. 16 is a diagram for describing Operation Example (mapping example) 2-3 according to Embodiment 2.

As illustrated in FIG. 16, for example, the PSCCH is mapped to 10 PRBs with the PRB numbers=10 to 19 (in symbols #1 and #2), and the PSSCH is mapped to 25 PRBs with the PRB numbers=0 to 25 in Operation Example 2-3. The 1st DMRS is then mapped to, for example, 15 PRBs in total where the PSCCH is not mapped, which are PRBs with the PRB numbers=0 to 9 and PRB numbers=20 to 24.

In other words, the 1st DMRS (of the PSSCH) used to demodulate the 2nd stage SCI is mapped only to some PRBs, among the 25 PRBs where the PSSCH is mapped, excluding the PRBs where the PSCCH is mapped (PRB numbers=0 to 9 and PRB numbers=20 to 24).

Thus, in a case where the 2nd stage SCI is mapped to a later symbol with reference to the symbol where the 1st DMRS is mapped, the 2nd stage SCI is mapped only to some PRBs (PRB numbers=0 to 9 and PRB numbers=20 to 24) excluding the PRB numbers where the PSCCH is mapped, as is the case with the mapping of the 1st DMRS to the PRBs.

Note that the demodulation is possible using the 2nd DMRS in a symbol where the 2nd DMRS is mapped or the subsequent symbols, although not illustrated in FIG. 16. Thus, as in Operation Example 2-2, in the symbol where the 2nd DMRS is mapped (e.g., symbol #5) or the subsequent symbols, all PRBs (PRB numbers=0 to 24) of the 25 PRBs may be used for the mapping of the 2nd stage SCI.

It can also be said that the PRBs within a range of the PRB numbers where the 1st DMRS is mapped may be used for the mapping of the 2nd stage SCI in a reference symbol or the preceding symbols in the PSSCH slot, and all PRBs with the PRB numbers where the PSSCH is mapped may be used for the mapping of the 2nd stage SCI in the symbols after the reference symbol.

Supplement to Embodiments 1 and 2

In Embodiments 1 and 2, descriptions have been given of which symbol in a PSSCH slot is used as reference to map the 2nd stage SCI (in other words, mapping examples of the 2nd stage SCI on the PSSCH). This may be taken as determining which resources among resources allocated to the PSSCH is reserved for the 2nd stage SCI.

The actual mapping order of the 2nd stage SCI may be, for example, in ascending order of the symbol number, in descending order of the symbol number, or in the same order as the resource reservation among the reserved resources. In addition, the 2nd stage SCI may be interleaved and mapped to the reserved resources.

The mapping in ascending order of the symbol number, for example, allows receiver terminal 200 to store the 2nd stage SCI in a buffer in chronological order of reception, thereby simplifying the reception processing for the 2nd stage SCI (e.g., eliminating the need for sorting the received 2nd stage SCI).

The values of parameters described in Embodiments 1 and 2, such as the number of SL symbols, symbol number, position of DMRSs, position of PSCCH, number of PRBs, and PRB number, are non-limiting examples. Embodiments 1 and 2 are also applicable to another value not specified in Embodiments 1 and 2.

In a case where the mapping of the PSCCH and the mapping of the 1st DMRS overlap (or collide) with each other in a PSSCH slot, for example, it is assumed that the 1st DMRS is not dropped but shifted to avoid the mapping of the PSCCH. For example, it is assumed that the 1st DMRS is shifted to a candidate symbol position for the 2nd DMRS. In this case, the 2nd DMRS may be replaced by the 1st DMRS in Embodiments 1 and 2 described above.

Further, in the above-described Embodiments 1 and 2, the mapping of the 2nd stage SCI to a PSSCH (slot) is determined with reference to the first DMRS that is actually transmitted (or mapped) in the PSSCH (slot), but may be determined with reference to one or more DMRSs secondly mapped or later.

Embodiment 3

Next, Embodiment 3 will be described. In Embodiment 3, when the 2nd stage SCI includes different information for unicast and groupcast (or multicast), for example, at least some of information bits are shared between the unicast and groupcast.

Sharing the information bits reduces the number of bits (i.e., format size) in a certain format of the 2nd stage SCI. The reduction of the number of bits makes it possible to reduce the amount of resources where the 2nd stage SCI is mapped, thereby shortening the time required for demodulating (and decoding) the 2nd stage SCI in receiver terminal 200, for example.

(Findings that LED to Embodiment 3)

The 1st stage SCI transmitted in the PSCCH is considered including information indicating the format of the 2nd stage SCI (hereinafter, sometimes referred to as "format information").

One of the reasons for this is that information (or parameters) to be used and the amount of the information are possibly different in the configuration on various SL communication including forms (may also be referred to as "applications" or "methods") of SL communication such as broadcast, groupcast, and unicast, for example.

Terminal 200 can recognize (or identify) the information amount (i.e., information size) of the 2nd stage SCI described in Embodiments 1 and 2 based on, for example, the format information of the 2nd stage SCI included in the 1st stage SCI. Accordingly, receiver terminal 200 can recognize that the 2nd stage SCI is mapped to an appropriate amount of resources for the information amount of the 2nd stage SCI.

Then, receiver terminal 200 can properly receive symbols where the 2nd stage SCI is mapped according to the mapping rules as described in Embodiments 1 and 2. Here, in a case where more types of formats (e.g., formats of different sizes) are present depending on the application, the number of bits used for indicating the format information of the 2nd stage SCI increases in the 1st stage SCI. More types of 2nd stage SCI formats possibly cause complicated processing in the communication system.

Meanwhile, it is also considered not changing the type (e.g., size) of the format depending on the application, for example, so as to decrease or not to increase the type of the format. It is assumed, however, that unused information has to be included in the format in order not to change the format size even when the information is unnecessary for a certain configuration, for example.

For example, when the format size of the 2nd stage SCI is determined in accordance with the longest information size that can be included in the 2nd stage SCI, the size can be massive. In other words, the format (size) of the 2nd stage SCI is not optimized for each configuration.

With this regard, in Embodiment 3, an information bit is shared for information that is used for unicast but not for groupcast, and information that is used for groupcast but not for unicast, for example. This information bit sharing reduces the format size of the 2nd stage SCI.

By way of non-limiting example, the information bit is shared between:

"CSI request" used for unicast; and

"HARQ feedback mode indication" used for groupcast.

The "CSI request" is an indication used to cause terminal 200 to measure the received quality of CSI-RS and to feed back the measured quality. Incidentally, for groupcast, the HARQ feedback method includes a mechanism of switching between two types of feedback information: "type 1" for transmitting only NACK among ACK and NACK, and "type2" for transmitting ACK or NACK. The "HARQ feedback mode indication" indicates which "type" to use to receiver terminal 200.

The "CSI request" is an indication (information) that is used for unicast but not for groupcast. Meanwhile, the "HARQ feedback mode indication" is an indication (information) that is used for groupcast but not for unicast.

Thus, if it is possible to determine which cast the 2nd stage SCI to be received is for, unicast or groupcast, from information other than the above information, for example, receiver terminal 200 can recognize whether the information included in the 2nd stage SCI is for unicast or groupcast.

By way of non-limiting example, the following three types of formats are prepared (configured or defined) for the 2nd stage SCI.

SCI format 0-2a: Used for broadcast

SCI format 0-2b: Used for groupcast or unicast

SCI format 0-2c: Used to determine whether to transmit feedback information depending on the distance expected by using a "zone ID", for example, in groupcast The "zone ID" is indicated in a case of using the "zone ID" in groupcast, so that the format size of the 2nd stage SCI for groupcast can be larger than the size of another format.

Non-limiting examples of the contents (information or parameters) of the three types of formats are assumed as follows.

<SCI Format 0-2a>

HARQ Process ID—[x] bits

New data indicator—1 bit

Redundancy version—2 bits

Source ID—8 bits

Destination ID—16 bits

<SCI Format 0-2b>

HARQ Process ID—[x] bits

New data indicator—1 bit

Redundancy version—2 bits

Source ID—8 bits

Destination ID—16 bits

CSI request—1 bit (for unicast)

HARQ feedback request—1 bit

HARQ feedback mode indication (option 1 or option 2)—1 bit (for groupcast)

<SCI Format 0-2c>

HARQ Process ID—[x] bits

New data indicator—1 bit

Redundancy version—2 bits

Source ID—8 bits

Destination ID—16 bits

Zone ID—[12] bits

Communication range requirement—[at least 4 bits]

In the above examples, the bit can be shared between "CSI request—1 bit (for unicast)" and "HARQ feedback mode indication (option 1 or option 2)—1 bit (for groupcast)" in the SCI format 0-2b.

Next, non-limiting examples of methods of indicating the SCI format will be described.

(Option 1)

The cast type (any of broadcast, groupcast, and unicast) is indicated to receiver terminal 200 in the SL communication by the format information of the 2nd stage SCI indicated (or included) in the 1st stage SCI.

When three bits of information (2nd stage SCI format indicator) can be used to indicate eight statuses of "0 to 8", for example, "0 to 3" can respectively indicate "SCI format 0-2a", "SCI format 0-2b", "SCI format 0-2b", and "SCI format 0-2c", as described in Table 2.

TABLE 2

SCI format indication examples (Option 1)

| 2nd stage SCI format indicator | SCI format of 2nd stage SCI | Cast type |
| --- | --- | --- |
| 0 | SCI format 0-2a | Broadcast |
| 1 | SCI format 0-2b | Unicast |
| 2 | SCI format 0-2b | Groupcast |
| 3 | SCI format 0-2c | Groupcast with distance based HARQ feedback |
| 4 to 7 | | reserved |

Here, status 1 and status 2 indicate the same SCI format (SCI format 0-2b) while status 1 indicates that it is for unicast, and status 2 indicates that it is for groupcast.

This allows receiver terminal 200 to recognize the contents of the 2nd stage SCI are different even when the formats of the 2nd stage SCI are the same and the sizes are the same.

(Option 2)

A destination ID that can identify whether it is for broadcast, groupcast, or unicast is determined in advance.

In a case where the "destination ID" is included in the 2nd stage SCI, the cast type (whether it is broadcast, groupcast, or unicast) is unknown at receiver terminal 200 at the time of receiving the format information of the 2nd stage SCI indicated by the 1st stage SCI.

Receiver terminal 200 recognizes the bit where the "destination ID" is mapped based on, for example, the format and size of the 2nd stage SCI, and determines the cast type from the "destination ID". Then, receiver terminal 200, for example, reads the meanings indicated by the other bits included in the 2nd stage SCI according to the determined cast type.

Table 3 is indication examples using the 2nd stage SCI format indicator (3 bits) in this case (Option 2).

TABLE 3

SCI format indication examples (Option 2)

| 2nd stage SCI format indicator | SCI format of 2nd stage SCI | Cast type |
| --- | --- | --- |
| 0 | SCI format 0-2a | Broadcast/Groupcast/Unicast |
| 1 | SCI format 0-2b | Groupcast/Unicast |
| 2 | SCI format 0-2c | Groupcast with distance based HARQ feedback |
| 3 to 7 | | reserved |

In Table 3, status 0, status 1, and status 2 respectively indicate "SCI format 0-2a", "SCI format 0-2b", and "SCI format 0-2c". Unlike the example described in Table 2 of Option 1, in Option 2, "SCI format 0-2a" may support at least one of groupcast and unicast in addition to broadcast, as exemplified in Table 3. Further, "SCI format 0-2b" may support at least one of groupcast and unicast.

Note that, although there are three types of 2nd stage SCI formats in Embodiment 3, four or more types of formats may be provided, or a single or two types of formats may be provided.

In a case of using a single format type, for example, a plurality of types of formats of different sizes may be supported while the name of the format is the same, and the 2nd stage SCI format indicator may indicate the format size of the 2nd stage SCI.

In addition, the number of bits of the 2nd stage SCI format indicator is not limited to 3 bits, and may be, for example, 1 bit, 2 bits, or 4 or more bits.

As described above, according to Embodiment 3, when different information is used for unicast and groupcast in information included in the 2nd stage SCI, at least some of the information bits are shared. This reduces the amount of information in a certain format of the 2nd stage SCI, and reduces the amount of resources where the 2nd stage SCI is mapped, thereby reducing the time required for demodulating (and decoding) the 2nd stage SCI, for example.

Note that the cast types for which the information bit is shared are not limited to the example described above, and may be two or more of unicast, groupcast, and broadcast. Further, the cast types are not limited to three types, and may be, for example, two types or four or more types.

The embodiments of the present disclosure have been described, thus far.

Supplement Common to Embodiments 1 to 3

In the channel to which an embodiment of the present disclosure is applied, a reference signal used as reference of the mapping of the 2nd stage CSI is not limited to the DMRS. For example, another reference signal, such as CSI-RS and PT-RS, may be used as reference of the mapping of the 2nd stage CSI.

Terminal 200 that performs SL communication may include, for example, a terminal that performs transmission processing but no reception processing, a terminal that performs reception processing but no transmission processing, or a terminal that performs both transmission and reception.

Operation Examples (mapping examples) described in Embodiments 1 to 3 may be appropriately used in combination.

In a case where the SL-related configuration is pre-configured to terminal 200, the configuration may be defined in the specification (e.g., standard), may be configured in an application layer called Pre-configured, may be configured in a SIM included in terminal 200, may be configured in a higher layer such as an SIB called configured or another RRC, or may be configured in a medium access control (MAC), for example.

An embodiment of the present disclosure is not limited to being applied to SL communication, but may be applied to communication between base station 100 and terminal 200 (Uu link communication). Any of Operation Examples described in Embodiments 1 to 3 above may be applied to the Uu link communication by replacing the PSCCH with a PDCCH, the PSSCH with a physical downlink shared channel (PDSCH) or physical uplink shared channel (PUSCH), the PSFCH with a physical uplink control channel (PUCCH), and the PSBCH with a physical broadcast channel (PBCH), for example. In addition, any of Operation Examples described in Embodiments 1 to 3 above may be applied to uplink control information (UCI), which is UL control information, transmitted in the PUSCH by replacing the 2nd stage SCI with the UCI. Note that the PDCCH, PDSCH, PUSCH, PUCCH, PBCH are examples of a downlink control channel, downlink data channel, uplink data channel, uplink control channel, and broadcast channel, respectively.

Operation Examples described in Embodiments 1 to 3 above may be applied only to Mode 2 among Mode 1 and Mode 2. In a case of Mode 2, transmitter terminal 200, for example, indicates the interval for transmitting SCI to another terminal 200, and shares information on the reservation of resources used for the SCI transmission. This makes it possible to avoid collision of the SCI or to reduce the collision rate.

In a case of Mode 1, terminal 200 may dynamically receive a configuration of the number of SL symbols per slot by a control signal such as the PDCCH over the Uu link from base station 100. Terminal 200 can variably set the number of SL symbols dynamically.

The 1st stage SCI may indicate a signal transmitted in the SCI format 0-1. The 2nd stage SCI may indicate a signal transmitted in the SCI format 0-2 or the SCI format 0-2x (where x=a, b, c, . . . ).

The slot where a channel such as the PSCCH, PSSCH, PSFCH, or PSBCH is mapped is, for example, a slot where at least one of transmission and reception of these channels is possible. Note that the slot where a channel such as the PSCCH, PSSCH, PSFCH, or PSBCH is mapped may include, for example, a slot where a signal to be transmitted or received is not mapped according to determination of terminal 200 or resource allocation.

The PSCCH and PSSCH may be time division multiplexed (TDM) or frequency division multiplexed (FDM) with each other.

The number of symbols per PSSCH slot and the number of symbols per PSCCH slot may be the number including a symbol used for automatic gain control (AGC), which is configured in the front section or back section of the channel.

The PSSCH slots may be consecutive or non-consecutive in time.

The number of PSCCH symbols is not limited to two symbols, and may be one symbol or three or more symbols. Further, the number of PSSCH symbols is not limited to the above examples, and may be another number of symbols.

The unit of the time resource is not limited to one or a combination of a slot and symbol, and may be, for example, a unit of the time resource such as a frame, subframe, slot, subslot, or symbol, or may be another unit of the time resource. In addition, the number of symbols included in a single slot is not limited to the number of symbols exemplified in Embodiments 1 to 3 described above, and may be another number of symbols.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

<5G NR System Architecture and Protocol Stacks>

3GPP has been working at the next release for the 5th generation cellular technology, simply called 5G, including the development of a new radio (NR) access technology operating in frequencies ranging up to 100 GHz. The first version of 5G standard was initially delivered in late 2017, which allows proceeding to trials and commercial deployments of 5G NR standard-compliant terminals, e.g., smartphones.

Figure 17:
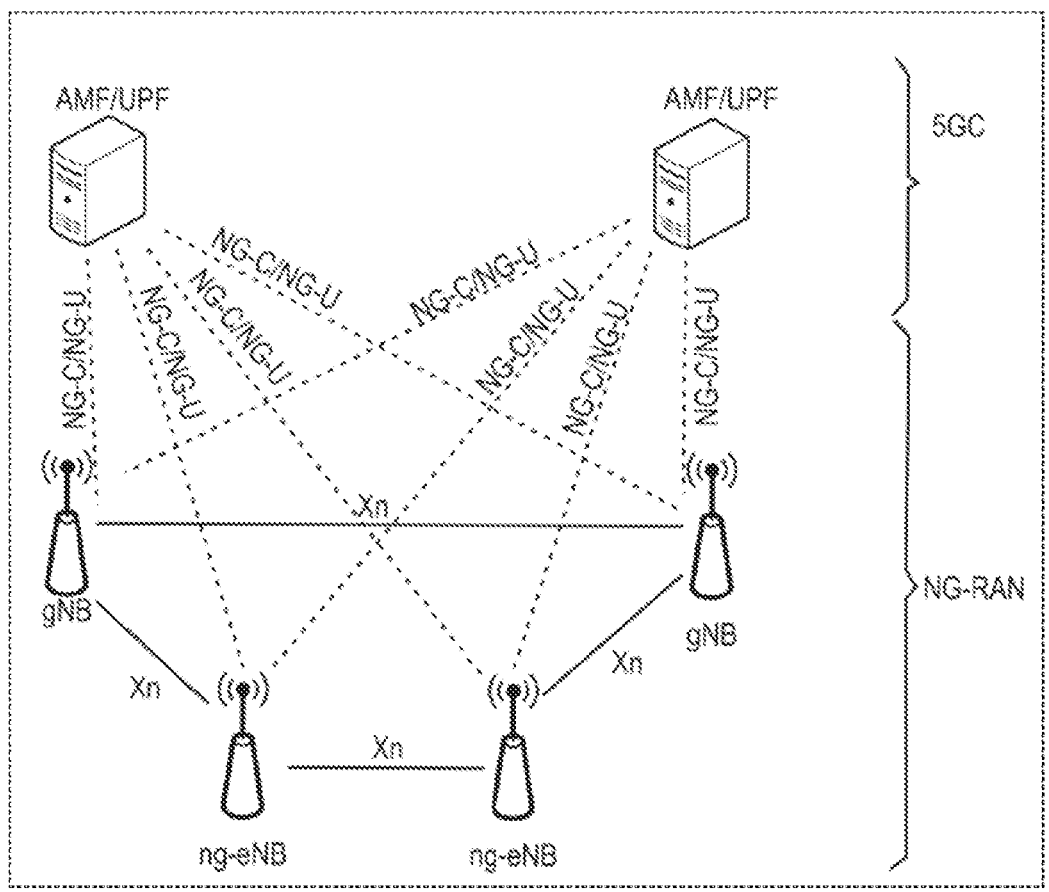
FIG. 17 illustrates an exemplary architecture for a 3GPP NR system.

For example, the overall system architecture assumes a Next Generation-Radio Access Network (NG-RAN) that includes gNBs. The gNBs provide the NG-radio access user plane (SDAP/PDCP/RLC/MAC/PHY) and control plane (RRC) protocol terminations towards a UE. The gNBs are interconnected with each other via an Xn interface. The gNBs are also connected to the Next Generation Core (NGC) via the Next Generation (NG) interface, more specifically to the Access and Mobility Management Function (AMF; e.g. a particular core entity performing the AMF) via the NG-C interface, and to the User Plane Function (UPF; e.g. a particular core entity performing the UPF) via the NG-U interface. The NG-RAN architecture is illustrated in FIG. 17 (see, for example, 3GPP TS 38.300 v15.6.0, section 4).

The user plane protocol stack for NR (see, for example, 3GPP TS 38.300, section 4.4.1) includes the Packet Data Convergence Protocol (PDCP, see clause 6.4 of TS 38.300) Radio Link Control (RLC, see clause 6.3 of TS 38.300) and Medium Access Control (MAC, see clause 6.2 of TS 38.300) sublayers, which are terminated in the gNB on the network side. Additionally, a new access stratum (AS) sublayer (Service Data Adaptation Protocol: SDAP) is introduced above the PDCP (see, for example, clause 6.5 of 3GPP TS 38.300). A control plane protocol stack is also defined for NR (see, for example, TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For example, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For example, the physical channels include a Physical Random Access Channel (PRACH), Physical Uplink Shared Channel (PUSCH), and Physical Uplink Control Channel (PUCCH) as uplink physical channels, and a Physical Downlink Shared Channel (PDSCH), Physical Downlink Control Channel (PDCCH), and Physical Broadcast Channel (PBCH) as downlink physical channels.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, the eMBB is expected to support peak data rates (20 Gbps for downlink and 10 Gbps for uplink) and user-experienced data rates in the order of three times what is offered by IMT-Advanced. Meanwhile, in a case of the URLLC, the tighter requirements are put on ultra-low latency (0.5 ms for each of UL and DL for user plane latency) and high reliability (1-10-5 within 1 ms). Finally, the mMTC may preferably require high connection density (1,000,000 devices/km2 in an urban environment), large coverage in harsh environments, and extremely long-life battery for low cost devices (15 years).

Thus, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (also referred to as TTI) than an mMTC service. Furthermore, deployment scenarios with large channel delay spreads may preferably require a longer CP duration than scenarios with short delay spreads. The subcarrier spacing may be optimized accordingly to retain the similar CP overhead. NR may support more than one value of subcarrier spacing. Correspondingly, subcarrier spacing of 15 kHz, 30 kHz, 60 kHz . . . are currently considered. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR, for each numerology and carrier, a resource grid of subcarriers and OFDM symbols is defined for each of uplink and downlink. Each element in the resource grid is called a resource element and is identified based on the frequency index in the frequency domain and the symbol position in the time domain (see 3GPP TS 38.211 v15.6.0).

<5G NR Functional Split Between NG-RAN and 5GC>

Figure 18:
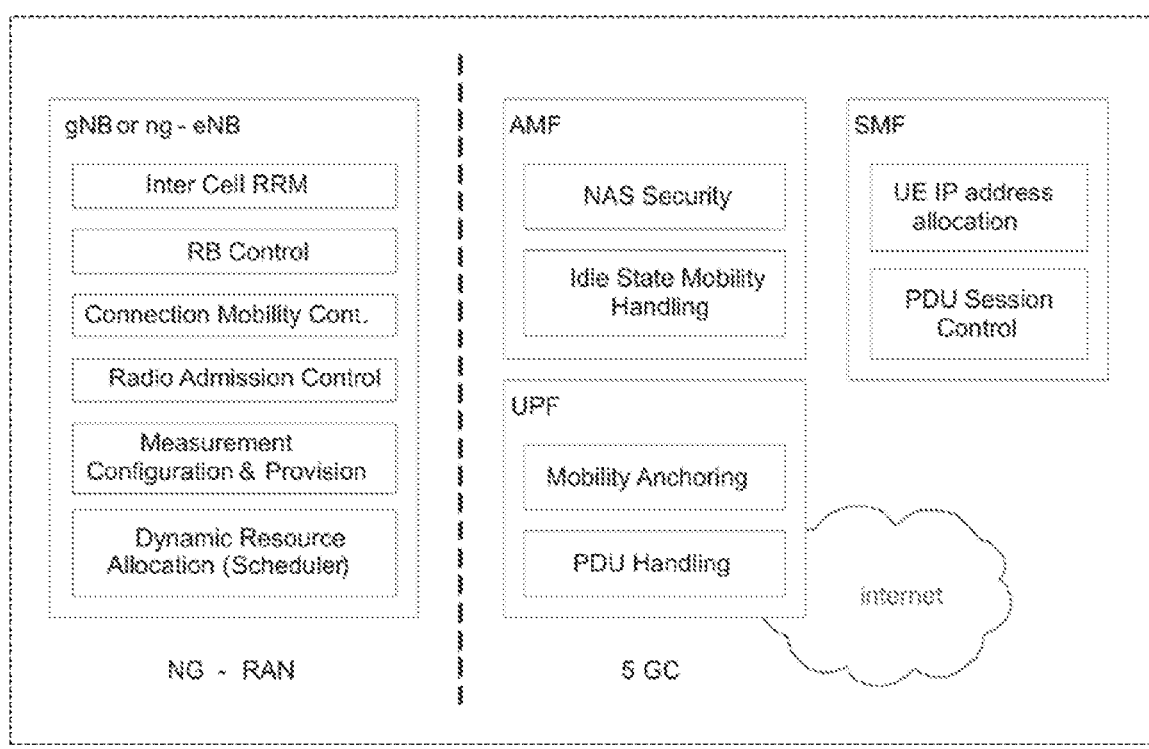
FIG. 18 is a schematic diagram illustrating functional split between NG-RAN and 5GC.

FIG. 18 illustrates functional split between NG-RAN and 5GC. An NG-RAN logical node is a gNB or ng-eNB. The 5GC has logical nodes AMF, UPF, and SMF.

For example, the gNB and ng-eNB host the following main functions:

- Functions for radio resource management such as radio bearer control, radio admission control, connection mobility control, dynamic allocation of resources to UEs in both uplink and downlink (scheduling);
- IP header compression, encryption, and integrity protection of data;
- Selection of an AMF at UE attachment when no routing to an AMF can be determined from the information provided by the UE;
- Routing of user plane data towards UPF(s);
- Routing of control plane information towards AMF;
- Connection setup and release;
- Scheduling and transmission of paging messages;
- Scheduling and transmission of system broadcast information (originated from the AMF or Operation, Admission, Maintenance (OAM));
- Measurement and measurement reporting configuration for mobility and scheduling;
- Transport level packet marking in the uplink;
- Session management;
- Support of network slicing;
- QoS Flow management and mapping to data radio bearers;
- Support of UEs in RRC_INACTIVE state;
- Distribution function for NAS messages;
- Radio access network sharing;
- Dual Connectivity; and
- Tight interworking between NR and E-UTRA.

The access and mobility management function (AMF) hosts the following main functions:

- Non-Access Stratum (NAS) signaling termination function;
- NAS signaling security;
- Access Stratum (AS) security control;
- Inter Core Network (CN) node signaling for mobility between 3GPP access networks;
- Idle mode UE reachability (including control and execution of paging retransmission);
- Registration area management;
- Support of intra-system and inter-system mobility;
- Access authentication;
- Access authorization including check of roaming rights;
- Mobility management control (subscription and policies);
- Support of network slicing; and
- Session Management Function (SMF) selection.

Furthermore, the user plane function (UPF) hosts the following main functions:

Anchor point for intra-/inter-RAT mobility (when applicable);

External protocol data unit (PDU) session point of interconnect to a data network;

Packet routing and forwarding;

Packet inspection and user plane part of policy rule enforcement;

Traffic usage reporting;

Uplink classifier to support routing traffic flows to a data network;

Branching point to support multi-homed PDU session;

QoS handling for user plane (e.g. packet filtering, gating, and UL/DL rate enforcement);

Uplink traffic verification (SDF to QoS flow mapping); and

Downlink packet buffering and downlink data indication triggering.

Finally, the session management function (SMF) hosts the following main functions:

Session management;

UE IP address allocation and management;

Selection and control of UPF;

Configuration function of traffic steering at a user plane function (UPF) to route traffic to proper destination;

Control part of policy enforcement and QoS; and

Downlink data indication.

<RRC Connection Setup and Reconfiguration Procedures>

Figure 19:
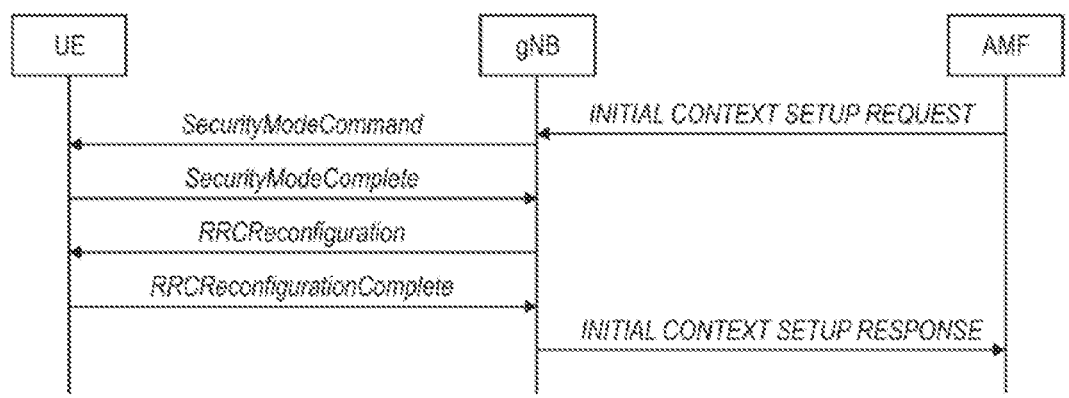
FIG. 19 is a sequence diagram for RRC connection setup/reconfiguration procedures.

FIG. 19 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. This transition involves that the AMF prepares the UE context data (including, for example, PDU session context, security key, UE radio capability, and UE security capabilities, etc.) and transmits the UE context data to the gNB with an INITIAL CONTEXT SETUP REQUEST. Then, the gNB activates the AS security with the UE, which is performed by the gNB transmitting a SecurityModeCommand message to the UE and by the UE responding to the gNB with a SecurityModeComplete message. Afterwards, the gNB performs the reconfiguration to set up the Signaling Radio Bearer 2 (SRB2) and Data Radio Bearer(s) (DRB(s)) by transmitting an RRCReconfiguration message to the UE and, in response, receiving an RRCReconfigurationComplete from the UE. For a signaling-only connection, the steps relating to the RRCReconfiguration are skipped since the SRB2 and DRBs are not setup. Finally, the gNB indicates to the AMF that the setup procedure is completed with an INITIAL CONTEXT SETUP RESPONSE.

In the present disclosure, thus, an entity (e.g., AMF, SMF, etc.) of the 5th Generation Core (5GC) is provided that includes control circuitry, which, in operation, establishes a Next Generation (NG) connection with a gNodeB, and a transmitter, which in operation, transmits an initial context setup message, via the NG connection, to the gNodeB to cause a signaling radio bearer setup between the gNodeB and user equipment (UE). In particular, the gNodeB transmits a radio resource control (RRC) signaling containing a resource allocation configuration information element (IE) to the UE via the signaling radio bearer. The UE then performs an uplink transmission or a downlink reception based on the resource allocation configuration.

<Usage Scenarios of IMT for 2020 and Beyond>

Figure 20:
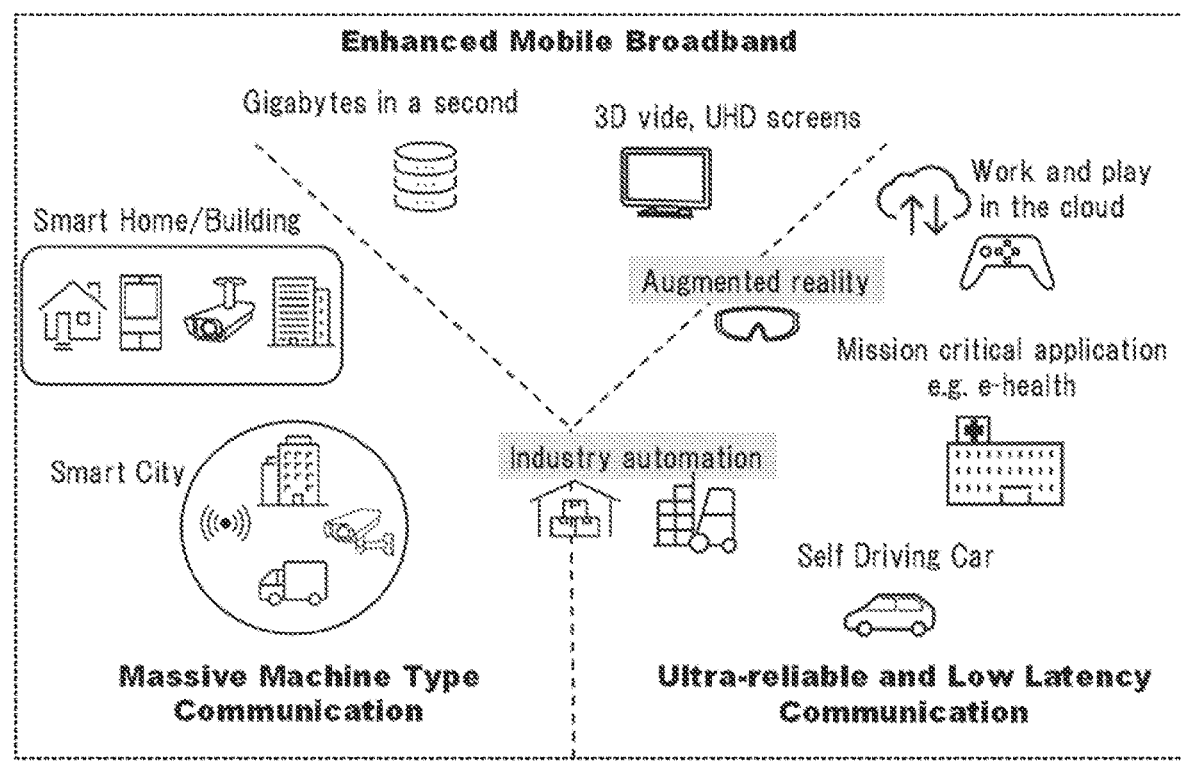
FIG. 20 is a schematic diagram illustrating usage scenarios of Enhanced Mobile Broadband (eMBB), Massive Machine Type Communications (mMTC), and Ultra Reliable and Low Latency Communications (URLLC)

FIG. 20 illustrates some of the use cases for 5G NR. In the 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 20 illustrates some examples of envisioned usage scenarios for IMT for 2020 and beyond (see, for example, ITU-R M. 2083 FIG. 21).

The URLLC use case has stringent requirements for capabilities such as throughput, latency, and availability. The URLLC use case has been envisioned as one of element techniques to enable future vertical applications such as wireless control of industrial manufacturing or production processes, remote medical surgery, distribution automation in a smart grid, transportation safety, etc. Ultra-reliability for the URLLC is to be supported by identifying the techniques to meet the requirements set by TR 38.913. For NR URLLC in Release 15, key requirements include a target user plane latency of 0.5 ms for uplink (UL) and 0.5 ms for downlink (DL). The general URLLC requirement for one transmission of a packet is a block error rate (BLER) of 1E−5 for a packet size of 32 bytes with a user plane latency of 1 ms.

From the physical layer perspective, reliability can be improved in a number of possible ways. The current scope for improving the reliability involves defining separate CQI tables for the URLLC, more compact DCI formats, repetition of PDCCH, etc. However, the scope may widen for achieving ultra-reliability as the NR becomes more stable and developed (for NR URLLC key requirements). Particular use cases of NR URLLC in Release 15 include augmented reality/virtual reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. The pre-emption means that a transmission for which resources have already been allocated is stopped, and the already allocated resources are used for another transmission that has been requested later but has lower latency/higher priority requirements. Accordingly, the already granted transmission is replaced with a later transmission. The pre-emption is applicable independent of the particular service type. For example, a transmission for a service-type A (URLLC) may be replaced with a transmission for a service type B (such as eMBB). Technology enhancements with respect to reliability improvement include dedicated CQI/MCS tables for the target BLER of 1E−5.

The use case of the mMTC (massive machine type communication) is characterized by a very large number of connected devices typically transmitting a relatively low volume of non-delay sensitive data. Devices are required to be low cost and to have a very long battery life. From the NR perspective, utilizing very narrow bandwidth parts is one possible solution to have power saving from the UE perspective and enable the long battery life.

As mentioned above, it is expected that the scope of reliability improvement in NR becomes wider. One key requirement to all the cases, and especially necessary for the URLLC and mMTC for example, is high reliability or ultra-reliability. Several mechanisms can be considered to improve the reliability from the radio perspective and network perspective. In general, there are a few key important areas that can help improve the reliability. These areas include compact control channel information, data/control channel repetition, and diversity with respect to the frequency, time, and/or spatial domain. These areas are applicable to reliability improvement in general, regardless of particular communication scenarios.

For NR URLLC, further use cases with tighter requirements have been considered such as factory automation, transport industry, and electrical power distribution. The tighter requirements are higher reliability (up to 10-6 level), higher availability, packet size of up to 256 bytes, time synchronization down to the order of a few µs where the value can be one or a few µs depending on frequency range and short latency in the order of 0.5 to 1 ms (e.g., target user plane latency of 0.5 ms) depending on the use cases.

Moreover, for NR URLLC, several technology enhancements from the physical layer perspective have been identified. These technology enhancements include Physical Downlink Control Channel (PDCCH) enhancements related to compact DCI, PDCCH repetition, and increased PDCCH monitoring. In addition, Uplink Control Information (UCI) enhancements are related to enhanced Hybrid Automatic Repeat Request (HARQ) and CSI feedback enhancements. Also, PUSCH enhancements related to mini-slot level hopping and retransmission/repetition enhancements have been identified. The term "mini-slot" refers to a transmission time interval (TTI) including a smaller number of symbols than a slot (a slot includes fourteen symbols).

<QoS Control>

The 5G Quality of Service (QoS) model is based on QoS flows and supports both QoS flows that require guaranteed flow bit rate (GBR QoS flows) and QoS flows that do not require guaranteed flow bit rate (non-GBR QoS Flows). At the NAS level, the QoS flow is thus the finest granularity of QoS differentiation in a PDU session. A QoS flow is identified within a PDU session by a QoS flow ID (QFI) carried in an encapsulation header over the NG-U interface.

For each UE, the 5GC establishes one or more PDU sessions. For each UE, the NG-RAN establishes at least one Data Radio Bearer (DRB) together with the PDU session, for example as illustrated above with reference to FIG. 19. Additional DRB(s) for QoS flow(s) of that PDU session can be subsequently configured (it is up to NG-RAN when to do so). The NG-RAN maps packets belonging to different PDU sessions to different DRBs. NAS level packet filters in the UE and 5GC associate UL and DL packets with QoS flows, whereas AS-level mapping rules in the UE and in the NG-RAN associate UL and DL QoS flows with DRBs.

Figure 21:
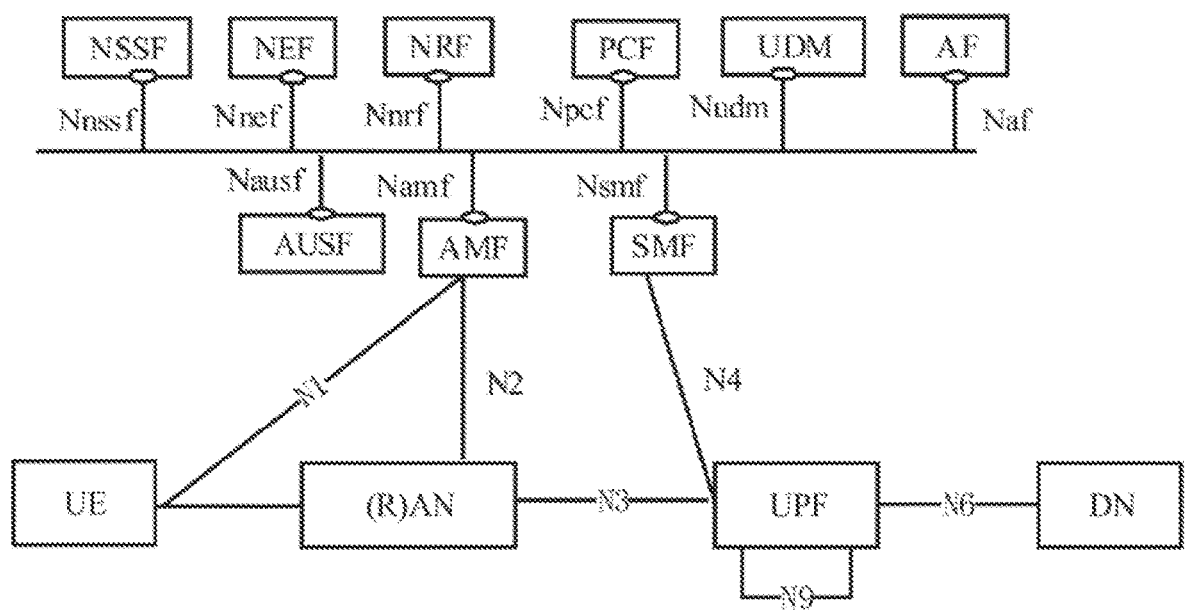
FIG. 21 is a block diagram illustrating an exemplary 5G system architecture for a non-roaming scenario.

FIG. 21 illustrates a 5G NR non-roaming reference architecture (see TS 23.501 v16.1.0, section 4.23). An Application Function (AF), e.g. an external application server hosting 5G services exemplified in FIG. 20, interacts with the 3GPP core network in order to provide services, for example, to support application influence on traffic routing, accessing a Network Exposure Function (NEF) or interacting with the policy framework for policy control (see Policy Control Function, PCF), e.g. QoS control. Based on operator deployment, application functions considered to be trusted by the operator can be allowed to interact directly with relevant network functions. Application functions not allowed by the operator to access directly the network functions use the external exposure framework via the NEF to interact with relevant network functions.

FIG. 21 illustrates further functional units of the 5G architecture, namely a Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access, or 3rd party services. All of or a part of the core network functions and the application services may be deployed and running on cloud computing environments.

In the present disclosure, thus, an application server (for example, AF of the 5G architecture), is provided that includes a transmitter, which in operation, transmits a request containing a QoS requirement for at least one of the URLLC, eMMB, and mMTC services to at least one of functions (for example NEF, AMF, SMF, PCF, UPF, etc) of the 5GC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

The technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure includes: control circuitry, which, in operation, determines mapping of certain control information to a data channel of sidelink based on mapping of a reference signal in the data channel and mapping of a control channel, the certain control information being related to first control information and being referred to as second control information, the first control information being transmitted in the sidelink; and transmission circuitry, which, in operation, transmits the data channel in accordance with the determined mapping.

In an embodiment of the present disclosure, the control circuitry may determine the mapping of the second control information to the data channel using, as a reference, a time resource where the reference signal is mapped.

In an embodiment of the present disclosure, when a first reference signal is not mapped to a first time resource and a second reference signal is mapped to a second time resource in the data channel, the control circuitry may determine the mapping of the second control information to the data channel using the second time resource as a reference.

In an embodiment of the present disclosure, when a first reference signal is not mapped to a first time resource allocated to the first reference signal and a second reference signal is mapped to a second time resource in the data channel, the control circuitry may determine the mapping of the second control information to the data channel using the second time resource as a reference.

In an embodiment of the present disclosure, the control circuitry may determine a time resource where the second control information is mapped to be at least one of the time resource where the reference signal is mapped and/or a time resource adjacent to the time resource.

In an embodiment of the present disclosure, when the second control information is not all mapped to the determined time resource where the second control information is mapped, the control circuitry may map the second control information that has not been mapped to a time resource before the time resource where the reference signal is mapped.

In an embodiment of the present disclosure, when the second control information is not all mapped to the determined time resource where the second control information is mapped, the control circuitry may map the second control information that has not been mapped to a time resource after the time resource where the reference signal is mapped.

In an embodiment of the present disclosure, when the second control information is not all mapped to the determined time resource where the second control information is mapped, the control circuitry may first map the second control information that has not been mapped to a time resource after the time resource where the reference signal is mapped and then maps the second control information to a time resource before the time resource.

In an embodiment of the present disclosure, the control circuitry may determine a frequency resource where the second control information is mapped in the data channel, based on a mapping order of the control channel in a frequency resource of the data channel.

In an embodiment of the present disclosure, the control circuitry may map the second control information to the frequency resource of the data channel in an order opposite to the mapping order of the control channel in the frequency resource.

A terminal according to an embodiment of the present disclosure includes: control circuitry, which, in operation, specifies mapping of certain control information to a data channel of sidelink based on information indicating the mapping determined based on mapping of a reference signal in the data channel and mapping of a control channel, the certain control information being related to first control information and being referred to as second control information, the first control information being transmitted in the sidelink; and reception circuitry, which, in operation, receives the data channel in accordance with the specified mapping.

A communication method according to an embodiment of the present disclosure includes: determining, by a terminal, mapping of certain control information to a data channel of sidelink based on mapping of a reference signal in the data channel and mapping of a control channel, the certain control information being related to first control information and being referred to as second control information, the first control information being transmitted in the sidelink; and transmitting, by the terminal, the data channel in accordance with the determined mapping.

A communication method according to an embodiment of the present disclosure includes: specifying, by a terminal, mapping of certain control information to a data channel of sidelink based on information indicating the mapping determined based on mapping of a reference signal in the data channel and mapping of a control channel, the certain control information being related to first control information and being referred to as second control information, the first control information being transmitted in the sidelink; and receiving, by the terminal, the data channel in accordance with the specified mapping.

The disclosure of Japanese Patent Application No. 2020-022683, filed on Feb. 13, 2020, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

100 Base station
102, 211 Resource pool configurator

103 Error correction encoder
104 Modulator
105 Signal assigner
106 Transmitter
107, 201 Receiver
108, 202 Signal Separator
109 Demodulator
110 Error correction decoder
200 Terminal
203-1 1st stage SCI receiver
203-2 2nd stage SCI receiver
204 SL demodulator
205 SL error correction decoder
206 Uu demodulator
207 Uu error correction decoder
212-1 1st stage SCI generator
212-2 2nd stage SCI generator
213 Uu error correction encoder
214 Uu modulator
215 SL error correction encoder
216 SL modulator
217 Signal assigner
218 Transmitter

The invention claimed is:

1. A terminal, comprising:
control circuitry, which, in operation, determines mapping of certain control information to a data channel of sidelink based on mapping of a reference signal in the data channel and mapping of a control channel, the certain control information being related to first control information and being referred to as second control information, the first control information being transmitted in the sidelink, wherein
the control circuitry determines the mapping of the second control information to the data channel using, as a reference, a time resource where the reference signal is mapped, and
when a first reference signal is not mapped to a first time resource and a second reference signal is mapped to a second time resource in the data channel, the control circuitry determines the mapping of the second control information to the data channel using the second time resource as the reference; and
transmission circuitry, which, in operation, transmits the data channel in accordance with the determined mapping.

2. The terminal according to claim 1, wherein the first time resource is allocated to the first reference signal.

3. The terminal according to claim 1, wherein the control circuitry determines a time resource where the second control information is mapped to be the time resource where the reference signal is mapped or a time resource adjacent to the time resource.

4. The terminal according to claim 3, wherein the control circuitry maps the second control information in order of the second time resource and a time resource before the time resource where the reference signal is mapped.

5. The terminal according to claim 3, wherein the control circuitry maps the second control information in order of the second time resource and a time resource after the time resource where the reference signal is mapped.

6. The terminal according to claim 3, wherein the control circuitry first maps the second control information in order of the second time resource, a time resource after the time resource where the reference signal is mapped, and a time resource before the time resource.

7. The terminal according to claim 1, wherein the control circuitry determines a frequency resource where the second control information is mapped in the data channel, based on a mapping order of the control channel in a frequency resource of the control channel.

8. The terminal according to claim 7, wherein the control circuitry maps the second control information to the frequency resource of the data channel in an order opposite to the mapping order of the control channel in the frequency resource of the control channel.

9. A terminal, comprising:
control circuitry, which, in operation, specifies mapping of certain control information to a data channel of sidelink based on information indicating the mapping determined based on mapping of a reference signal in the data channel and mapping of a control channel, the certain control information being related to first control information and being referred to as second control information, the first control information being transmitted in the sidelink, wherein
the control circuitry specifies the mapping of the second control information to the data channel using, as a reference, a time resource where the reference signal is mapped, and
when a first reference signal is not mapped to a first time resource and a second reference signal is mapped to a second time resource in the data channel, the control circuitry specifies the mapping of the second control information to the data channel using the second time resource as the reference; and
reception circuitry, which, in operation, receives the data channel in accordance with the specified mapping.

10. A communication method, comprising:
determining, by a terminal, mapping of certain control information to a data channel of sidelink based on mapping of a reference signal in the data channel and mapping of a control channel, the certain control information being related to first control information and being referred to as second control information, the first control information being transmitted in the sidelink, wherein
the terminal determines the mapping of the second control information to the data channel using, as a reference, a time resource where the reference signal is mapped, and
when a first reference signal is not mapped to a first time resource and a second reference signal is mapped to a second time resource in the data channel, the terminal determines the mapping of the second control information to the data channel using the second time resource as the reference; and
transmitting, by the terminal, the data channel in accordance with the determined mapping.

11. A communication method, comprising:
specifying, by a terminal, mapping of certain control information to a data channel of sidelink based on information indicating the mapping determined based on mapping of a reference signal in the data channel and mapping of a control channel, the certain control information being related to first control information and being referred to as second control information, the first control information being transmitted in the sidelink, wherein
the terminal specifies the mapping of the second control information to the data channel using, as a reference, a time resource where the reference signal is mapped, and when a first reference signal is not mapped to a first time resource and a second reference signal is mapped to a second time resource in the data channel, the terminal specifies the mapping of the second control information to the data channel using the second time resource as the reference; and receiving, by the terminal, the data channel in accordance with the specified mapping.

* * * * *